(12) United States Patent
Yamada et al.

(10) Patent No.: US 6,750,917 B2
(45) Date of Patent: Jun. 15, 2004

(54) DEVICE INTERCONNECT SYSTEM USING ANALOG LINE

(75) Inventors: Hisashi Yamada, Yakohama (JP); Hideo Ando, Hino (JP); Takeshi Saito, Meguro-ku (JP); Shinichiro Koto, Kawasaki (JP); Taku Kato, Kamakura (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 127 days.

(21) Appl. No.: 09/814,717

(22) Filed: Mar. 23, 2001

(65) Prior Publication Data

US 2001/0038422 A1 Nov. 8, 2001

Related U.S. Application Data

(63) Continuation of application No. PCT/JP00/05647, filed on Aug. 23, 2000.

(30) Foreign Application Priority Data

| Aug. 27, 1999 | (JP) | 11-242202 |
| Feb. 29, 2000 | (JP) | 2000-054593 |
| Feb. 29, 2000 | (JP) | 2000-054594 |
| Mar. 30, 2000 | (JP) | 2000-093927 |

(51) Int. Cl.[7] .............................. H04N 7/08
(52) U.S. Cl. ...................... 348/478; 348/468; 348/552; 348/460
(58) Field of Search ................. 348/478, 476, 348/473, 460, 552, 468, 465, 462, 461; 725/80; 710/101

(56) References Cited

U.S. PATENT DOCUMENTS 5,341,166 A * 8/1994 Garr et al. ............... 348/10
5,822,425 A * 10/1998 Ezaki et al. .............. 380/5
6,037,932 A * 3/2000 Feinleib ................. 345/327
6,161,156 A * 12/2000 Suzuki et al. ............ 710/101
6,268,889 B1 * 7/2001 Koori .................... 348/642
6,437,830 B1 * 8/2002 Horlander ............... 348/478

FOREIGN PATENT DOCUMENTS

| JP | 9-187041 | 7/1997 |
| JP | 9-331507 | * 12/1997 |
| JP | 10-262225 | 9/1998 |
| JP | 11-234616 | 8/1999 |

OTHER PUBLICATIONS

T. Ezaki, et al., ITE Technical Report, vol. 21, No. 31, pp. 21–26, "CGMAS–A Information Transfer Method Using Vertical Blanking Interval," May 1997, Japanese Language.

ITE Technical Report vol. 21, No. 31, p. 22, Ezaki et al.; Published on May 22, 1997.

* cited by examiner

*Primary Examiner*—Victor R. Kostak
(74) *Attorney, Agent, or Firm*—Oblon, Spivak, McClelland, Maier & Neustadt, P.C.

(57) ABSTRACT

In a system for transferring an analog video signal which contains command information and the like in vertical blanking interval VBI between master and slave devices via an analog line, information (bits 1 to 20) having a word configuration (words 0 to 2+CRCC) consisting of a predetermined number of bits (variable within the range from 5 bits to 80 bits) is superposed in a predetermined period (49.1 $\mu$s) of a predetermined VBI line (line number 10) at a predetermined clock (fsc/32 to fsc/2). In this manner, device which are interconnected via an analog video signal line can transfer information having various contents/lengths that can be changed in correspondence with a partner connected using vertical blanking interval VBI.

15 Claims, 27 Drawing Sheets

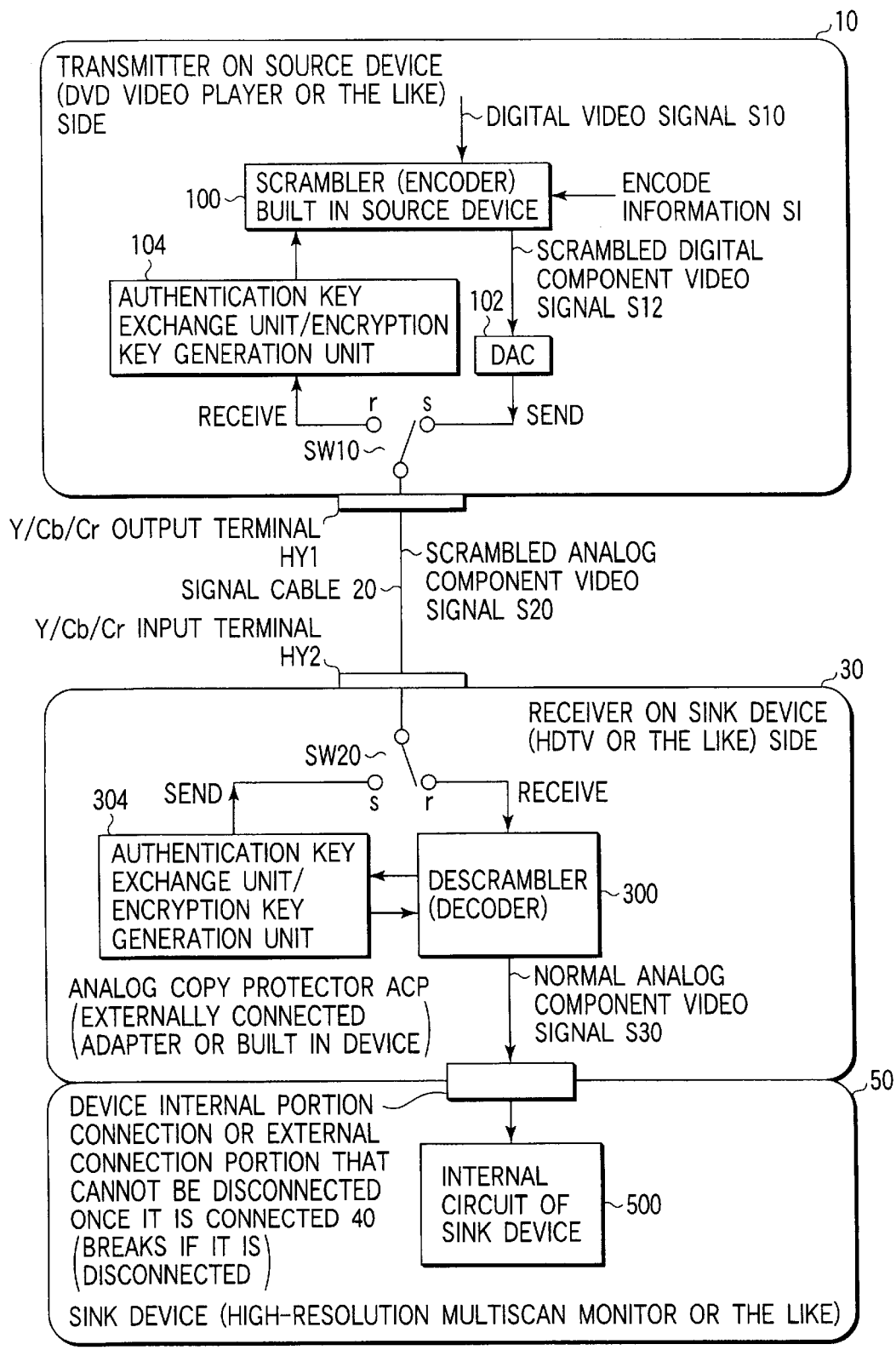
F I G. 1

| LINE NUMBER OF VIDEO BLANKING INTERVAL VBI | STATUS OF TRANSMITTER | |
|---|---|---|
| 10/273 | CHALLENGE (SEND) | DEVICE AUTHENTICATION/KEY EXCHANGE |
| 11/274 | RESPONSE (RECEIVE) | |
| 12~21/275~284 | OTHER VBI DATA (SEND) | |
| 22~262/285~525 | SCRAMBLED ANALOG VIDEO SIGNAL (SEND) | |

FIG. 2

| SCRAMBLE TYPE | CONTENTS |
|---|---|
| TYPE 1 | RANDOMLY INVERT CHROMA (C) SIGNAL |
| TYPE 2 | RANDOMLY INVERT LUMINANCE (Y) SIGNAL |
| TYPE 3 | RANDOMLY INVERT Y/C SIGNALS |
| TYPE 4 | RANDOMLY REPLACE Y/C SIGNALS |
| TYPE n (OPTION) | RANDOMLY INVERT/RANDOMLY REPLACE SIGNALS OTHER THAN Y/C |
| REFRESH INTERVAL OF RANDOM INVERSION (REPLACEMENT) | EVERY FRAME OR PREDETERMINED TIME (E.G., EVERY 0.4 TO 1.2 SEC) |

FIG. 3

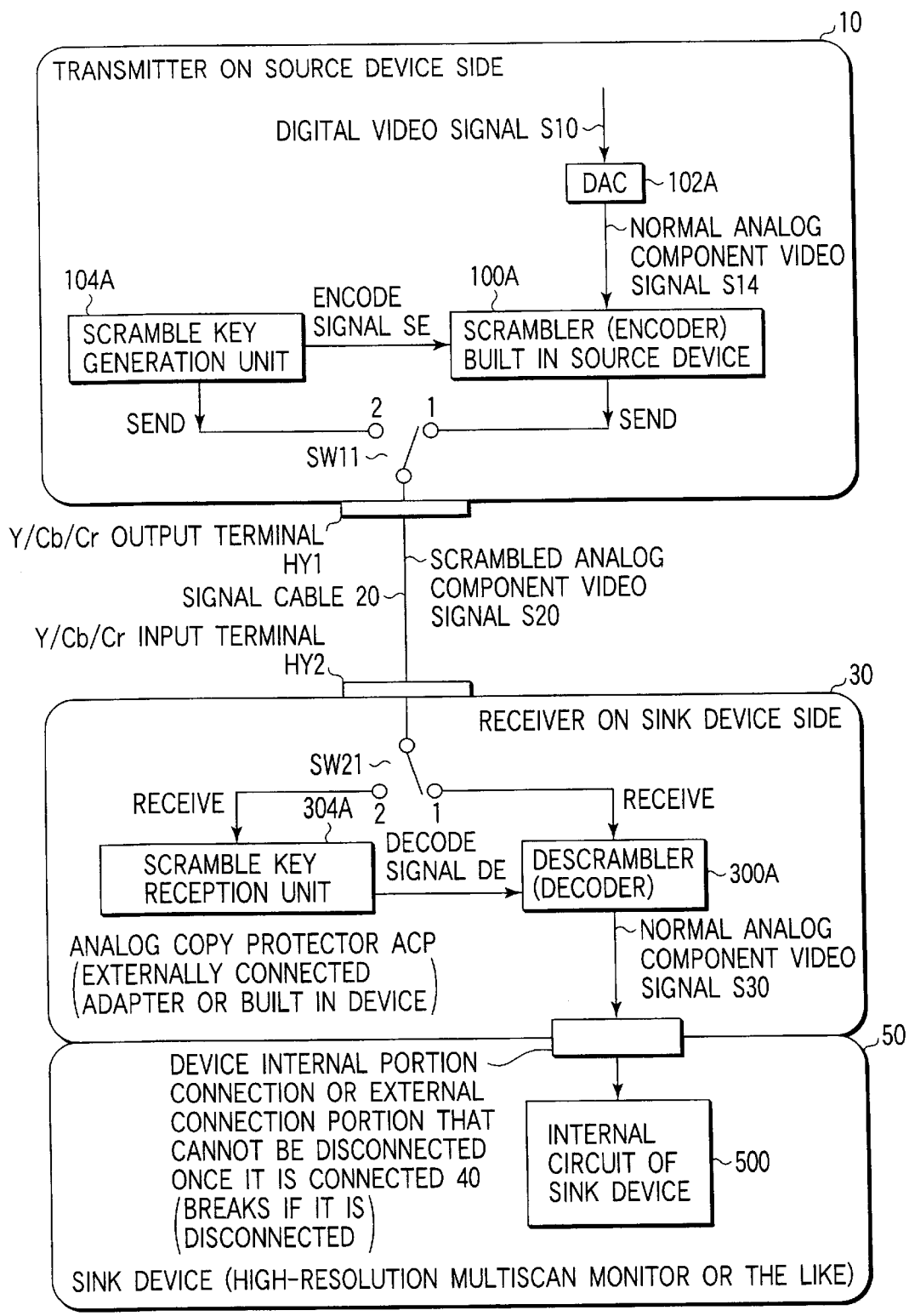
F I G. 5

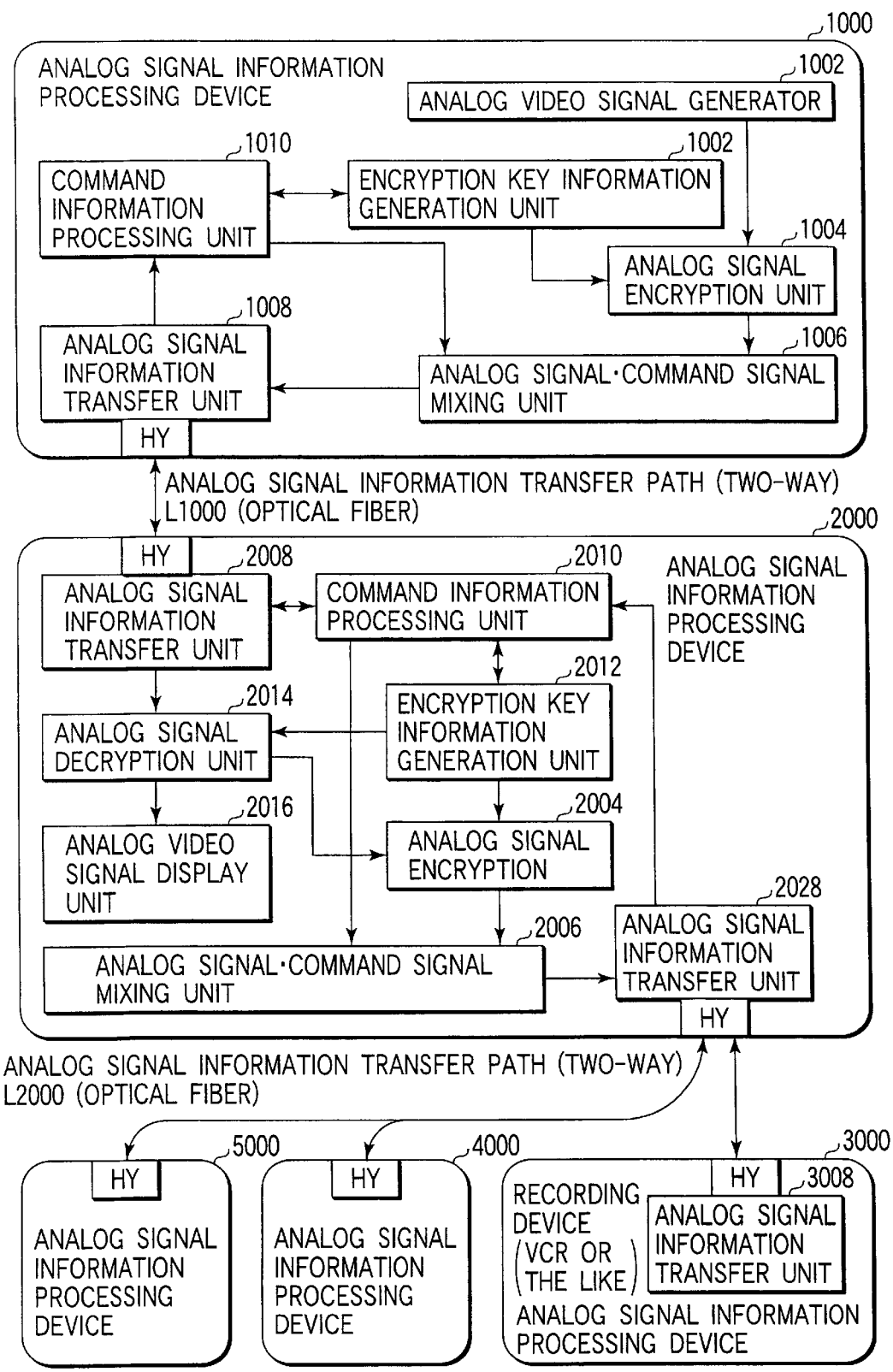
F I G. 8

(a)
| TRANSFER INFORMATION TI | | |
|---|---|---|
| VIDEO INFORMATION TRANSFER PERIOD VTP | VERTICAL BLANKING INTERVAL VBI | VIDEO INFORMATION TRANSFER PERIOD VTP |

(b)
| VIDEO INFORMATION VI | EQUIVALENT PULSE TRANSFER AREA EPTA | VERTICAL SYNC PULSE AREA VSPA | EQUIVALENT PULSE TRANSFER AREA EPTA | COMMAND-INFORMATION TRANSFER AREA CITA | | TEXT SIGNAL TRANSFER AREA TXTA | COMMAND INFORMATION TRANSFER AREA CITA | VIDEO SIGNAL TX | VIDEO INFORMATION VI |
|---|---|---|---|---|---|---|---|---|---|
| 525 | 1~3 | 4~6 | 7~9 | 10 | 11 12 13 | 14~16 | 17~20 | 21 | 22 |

HORIZONTAL SCAN LINE NUMBER (c)
| DATA LINE DL (296BITS) | |
|---|---|
| SYNCHRONIZATION PART SYNC (24BITS) | DATA PACKET DP (272BITS) |

| CLOCK LINE CL (16BITS) | FRAMING CODE FC (8BITS) | COMMAND INFORMATION PART CI (190BITS) | CHECK CODE CC (82BITS) |
|---|---|---|---|

(d)
| PREFIX PF (14BITS) | COMMAND DATA BLOCK CDB (176BITS) |
|---|---|

(e)
| SLOT ID SLID (8) | TRANSMISSION DEVICE ID TRID (16) | RECEPTION DEVICE ID RRID (16) | COMMAND CODE CMCD (8BITS) | SERIAL NUMBER IN SINGLE COMMAND SCSN (8BITS) | COMMAND PARAMETER CMPR (CONTAINING KEY INFORMATION) (120BITS) |
|---|---|---|---|---|---|

FIG. 15

| COMMAND CODE | COMMAND NAME | COMMAND CONTENTS |
|---|---|---|
| 01 | Announce Drive ID | ID ACQUISITION DECLARATION OF CONNECTED DEVICE |
| 02 | Request Drive IDs | ID DECLARATION REQUEST OF ALL CONNECTED DEVICES |
| 03 | Command Line Control | DESIGNATE DEVICE THAT CAN PROVIDE COMMAND INFORMATION TO BE ASSIGNED TO EACH VB LINE |
| 04 | Slot_ID Create | SET SESSION DESIGNATION ID BETWEEN DEVICES |
| 05 | Send Key | SEND ENCRYPTION KEY (USED IN MUTUAL AUTHENTICATION) |
| 06 | Report Key | SEND REPLY KEY (USED IN MUTUAL AUTHENTICATION) |
| 07 | Record | VIDEO RECORDING CONTROL OF VIDEO INFORMATION WITHIN DESIGNATED RANGE |
| 08 | Play | REPRODUCTION CONTROL WITHIN DESIGNATED RANGE |
| 09 | Stop | STOP COMMAND OF REPRODUCTION, ETC. |
| 10 | Pause | PAUSE COMMAND DURING REPRODUCTION, ETC. |
| 11 | Eject | UNLOAD COMMAND OF VIDEO INFORMATION RECORDING MEDIUM |
| 12 | Start | PROCESSING START COMMAND |
| 13 | Reverse | REVERSE REPRODUCTION OF VIDEO INFORMATION |
| 14 | FF | FASTFORWARD CONTROL |
| 15 | FR | REWIND CONTROL |
| 16 | Combine | COMBINE TWO VIDEOS |
| 17 | Divide | DIVIDE ONE VIDEO |
| 18 | Move | MOVE PROCESS OF VIDEO INFORMATION |
| 19 | Search | SEARCH PROCESS OF SPECIFIC VIDEO |
| 20 | TOC Read | REPRODUCE CONTROL INFORMATION ON VIDEO INFORMATION RECORDING MEDIUM |
| 21 | TOC Write | RECORD CONTROL INFORMATION ON VIDEO INFORMATION RECORDING MEDIUM |
| 22 | Undo | UNDO PREVIOUS PROCESS |
| ... | ... | ... |

FIG. 16

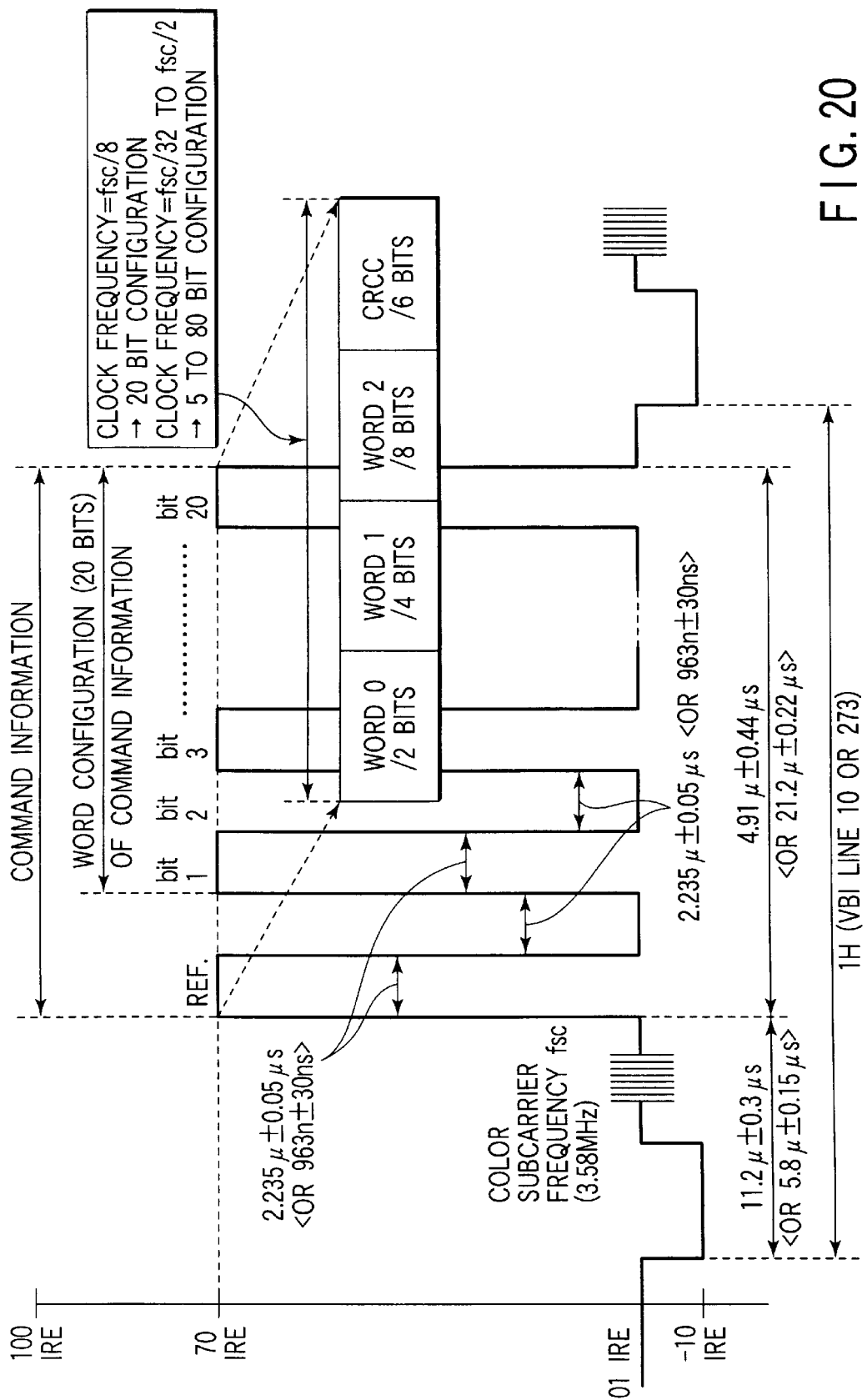
F I G. 20

| IMAGE QUALITY | INFORMATION LOCATION | COPY NEVER | COPY ONCE | COPY FREE |
|---|---|---|---|---|
| HD OF U.S.A. | DISPLAY SCREEN | SCRAMBLED TRANSFER WM+CGMS-A | SCRAMBLED TRANSFER WM+CGMS-A | CGMS-A |
| | VBI (L10-L19) | KEY INFORMATION, COMMAND, SERVICE INFORMATION | KEY INFORMATION, COMMAND, SERVICE INFORMATION | COMMAND, SERVICE INFORMATION |
| HD OF JAPAN (NOTE 1) (NOTE 2) | DISPLAY SCREEN | SCRAMBLED TRANSFER WM+CGMS-A | SCRAMBLED TRANSFER WM+CGMS-A | CGMS-A |
| | VBI (L10-L19) | KEY INFORMATION, COMMAND, SERVICE INFORMATION | KEY INFORMATION, COMMAND, SERVICE INFORMATION | COMMAND, SERVICE INFORMATION |
| EXISTING SD | DISPLAY SCREEN | WM+CGMS-A | WM+CGMS-A | CGMS-A |
| | VBI (L10-L19) | MACROVISION (NOTE 3) | SERVICE INFORMATION ALONE (NOTE 4) | SERVICE INFORMATION ALONE |
| NEW SD | DISPLAY SCREEN | WM+CGMS-A | WM+CGMS-A | CGMS-A |
| | VBI (L10-L19) | MACROVISION (NOTE 3) | COMMAND, SERVICE INFORMATION | COMMAND, SERVICE INFORMATION |

WM=WATERMARK (DIGITAL WATERMARK)
CGMS-A=COPY GENERATION MANAGEMENT SYSTEM A
HD=HIGH RESOLUTION; SD=STANDARD RESOLUTION;
VBI=VERTICAL BLANKING INTERVAL

FIG. 21

PACKET FORMAT

| LAYER LEVEL | CONTENTS |
|---|---|
| 1 | *VERSION NUMBER (FOR EXAMPLE, 1:1 TRANSFER FOR VERSION 1 |
| 2 | *PACKET LENGTH (REQUIRED WHEN PACKET SIZE EXCEEDS ONE VBI LINE) |
| 3 | *COMMAND OR RESPONSE |
| 4 | *TYPE<br>CONFIRMATION OF HY TERMINAL; PLUG & PLAY; AUTHENTICATION/KEY EXCHANGE; DEVICE CONTROL (SIMPLIFIED COMMAND ~ FUNCTION CONTROL PROTOCOL FCP/IEEE1349AVC; VIDEO ID; TELETEXT; DATA BROADCAST; CONTINUOUS FROM PREVIOUS PACKET; DEVICE RESET (RESET OF IEEE1394), ETC.)<br><EXAMPLE OF TYPE><br>EXAMPLE 1 ··· FOR CONFIRMATION OF HY TERMINAL<br>"ARE YOU HY TERMINAL ? ··· YES/NO"<br>EXAMPLE 2 ··· FOR PLUG & PLAY (COMMAND/RESPONSE)<br>"WHAT DEVICE ARE YOU ? (IEEE1212 FORMATION)"<br>"SEND YOUR ICON (BITMAP DATA)"<br>"WHAT KIND OF TERMINAL ARE YOU ? CONVENTIONAL INPUT TERMINAL ? CONVENTIONAL OUTPUT TERMINAL ? HY INPUT TERMINAL ? HY OUTPUT TERMINAL OR HY INPUT TERMINAL (TWO-WAY TERMINAL) ? OR COMPOSITE TERMINAL ? S TERMINAL ? COMPONENT TERMINAL ?"<br>"SEND YOUR ATTRIBUTE INFORMATION (ASPECT RATIO, ETC.)"<br>"WHAT IS YOUR NATIONALITY (DVD REGION CODE, ETC.) ?" |
| 5 | *TYPE DEPENDENT FIELD<br>EXAMPLE ··· IF TYPE IS DEVICE CONTROL THAT COMMANDS VCR VIDEO RECORDING<br>FIELD CONTAINING CONTENTS "RECORD BROADCAST ON BS 7ch FROM 1:15:00 PM TO 2:00 PM, JANUARY 1, 1999"<br>THIS FIELD CAN BE FURTHER DIVIDED INTO LAYERS LIKE IN IEEE1394AVC |

FIG. 23

EXAMPLE WHEN TYPE IS AUTHENTICATION/KEY EXCHANGE
(COMPLYING WITH IEEE1394 COMMAND PROTOCOL)

| |
|---|
| CHALLENGE OF DEVICE CERTIFICATION/AUTHENTICATION REQUEST |
| RESPONSE OF DEVICE CERTIFICATION/AUTHENTICATION REQUEST |
| SEND/RECEIVE AUTHENTICATION KEY |
| SEND/RECEIVE EXCHANGE KEY |
| SEND/RECEIVE SUBUNIT REQUEST (SUBUNIT=ONE OR MORE SUBFUNCTIONS OF SINGLE DEVICE) |
| SYSTEM RENEWABILITY MESSAGE SRM |
| CANCEL AUTHENTICATION/KEY EXCHANGE |

F I G. 24

EXAMPLE WHEN TYPE IS DEVICE CONTROL

| | |
|---|---|
| SIMPLIFIED COMMAND<br>·REMOTE-CONTROLLER LIKE<br>·DEVICE IS HANDLED AS SINGLE FUNCTION | *IEEE1394AVC<br>(AVC=AUDIO·VISUAL CONTROL) |
| COMMAND/STATUS | *FUNCTION CONTROL PROTOCOL FCP |
| COMMAND NAME | *AVC OPECODE<br>EXAMPLE ··· VCR REPRODUCTION, TUNER TUNING, ETC. |
| OPERAND | *AVC OPERAND < ><br>EXAMPLE 1 (VCR REPRODUCTION) ···<br>TRIPLE-SPEED REPRODUCTION <+3>,<br>REWIND REPRODUCTION <-1>, ETC.<br>EXAMPLE 2 (TUNER TUNING) ···<br>VHF 1ch<101>, BS 7ch <207>, ETC. |

F I G. 25

ANALOG COPY GENERATION MANAGEMENT SYSTEM CGMS-A
| CGMS | DEFINITION |
|---|---|
| 0, 0 | ALLOW COPY UNLIMITEDLY (COPY FREE) |
| (0, 1) | (NOT DEFINED) |
| 1, 0 | ALLOW COPY OF ONE GENERATION (INHIBIT COPY OF COPY) |
| 1, 1 | INHIBIT COPY (COPY NEVER) |
F I G. 26
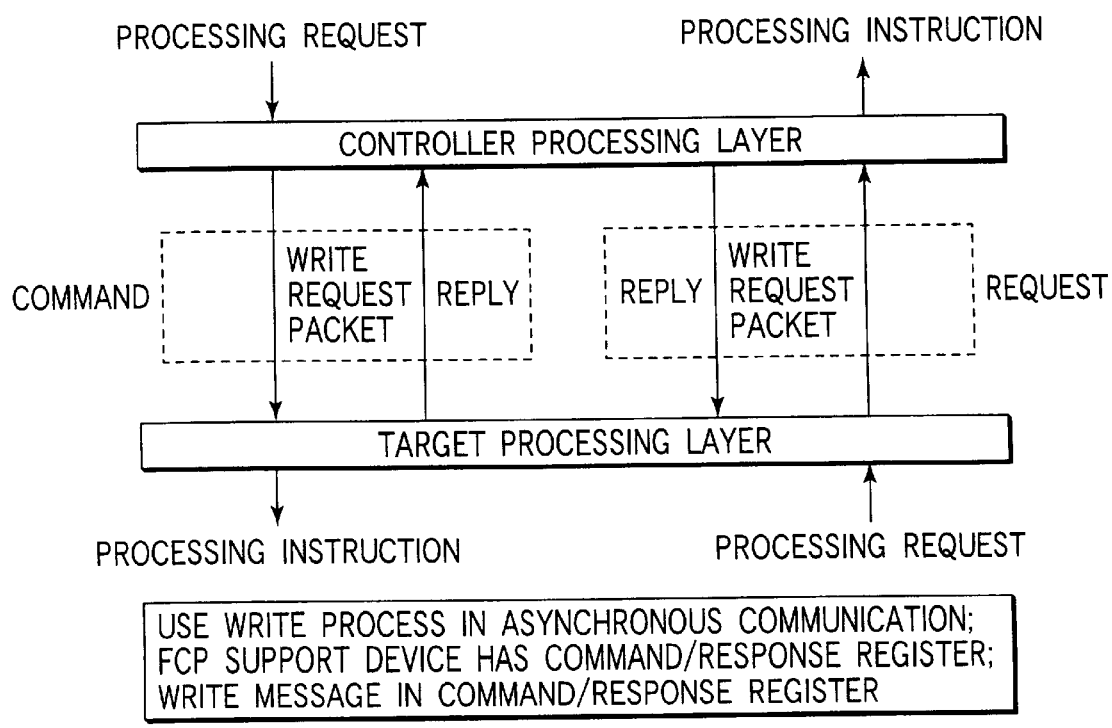
F I G. 27

FIG. 28

| TARGET DEVICE TYPE CODE | COMMON CONTROL CODE | | INDIVIDUAL CONTROL CODE | |
|---|---|---|---|---|
| | COMMON GENERAL CODE | COMMON ATTRIBUTE CODE | INDIVIDUAL GENERAL CONTROL CODE | CODE ATTRIBUTE |
| EXAMPLE><br>0 ⋯ TV<br>1 ⋯ ANALOG VCR<br>2 ⋯ DIGITAL VCR<br>3 ⋯ DVD PLAYER<br>4 ⋯ DVD RECORDER<br>5 ⋯ STB (SETTOP BOX)<br>6 ⋯ PC (PERSONAL COMPUTER)<br>7 ⋯ SWITCHER<br>8 ⋯ EDITOR<br>9~15 ⋯ RESERVED | EXAMPLE><br>0 ⋯ CHANNEL DESIGNATION (CHANNEL SWITCHING) | EXAMPLE><br>0a ⋯ CHANNEL NUMBER | EXAMPLE><br>00 ⋯ RESOLUTION<br><br>01 ⋯ ASPECT RATIO | EXAMPLE><br>00a ⋯ 720×480<br>00b ⋯ 704×480<br>01a ⋯ 16:9<br>01b ⋯ 4:3 |
| | 1 ⋯ TONE VOLUME CONTROL | 1a ⋯ INCREASE TONE VOLUME<br>1b ⋯ DECREASE TONE VOLUME | | |
| | 2 ⋯ REPRODUCTION | 2a ⋯ NORMAL REPRODUCTION<br>2b ⋯ DOUBLE-SPEED REPRODUCTION<br>2c ⋯ QUADRUPLE-SPEED REPRODUCTION<br>2d ⋯ REVERSE REPRODUCTION<br>2e ⋯ DOUBLE-SPEED REVERSE REPRODUCTION<br>2f ⋯ QUADRUPLE-SPEED REVERSE REPRODUCTION | | |
| | 3 ⋯ RECORDING (VIDEO/AUDIO RECORDING) | 3a ⋯ NONE (ALL ZEROS) | | |

FIG. 29

| INQUIRY/ REPLY FLAG | INQUIRY-SIDE DEVICE | | REPLY-SIDE DEVICE | | PROPERTY TYPE | | PROPERTY CONTENTS |
|---|---|---|---|---|---|---|---|
| | DEVICE TYPE ID | MANUFAC- TURER NAME | DEVICE TYPE ID | MANUFAC- TURER NAME | TARGET PROPERTY | DETAILED PROPERTY | |
| EXAMPLE> 0... NO INQUIRY/ REPLY OR IMPOSSIBLE TO REPLY 1... INQUIRY 2... REPLY 3... SPONTANEOUS PROPERTY DECLARATION (SPONTANE- OUSLY DECLARE WHAT IT IS) 4... ERROR MESSAGE | EXAMPLE> 0... TV 1... ANALOG VCR 2... DIGITAL VCR 3... DVD PLAYER 4... DVD RECORDER 5... STB 6... PC 7... SWITCHER | EXAMPLE> CHARACTER CODE OF MANUFAC- TURER, OR MANUFAC- TURER NAME USING CHARACTERS | EXAMPLE> 0... TV 1... ANALOG VCR 2... DIGITAL VCR 3... DVD PLAYER 4... DVD RECORDER 5... STB 6... PC 7... SWITCHER | EXAMPLE> CHARACTER CODE OF MANUFAC- TURER, OR MANUFAC- TURER NAME USING CHARACTERS | EXAMPLE> 0... SCREEN 1... SOUND SOURCE 2... CHANNEL 3... RESER- VATION INFOR- MATION | EXAMPLE> 0a... RESOLUTION 0b... ASPECT RATIO 1a... TONE VOLUME 1b... ECHO 2a... TV 1CH 2b... TV 3CH : 2J... BS 7CH 2K... BS 9CH 3a... YEAR, MONTH, DAY, HOUR, MINUTE, SECOND 3b... BROADCAST/ AV INPUT 3C... VIDEO RECORDING/ REPRODUCTION | EXAMPLE> RESOLUTION... 720×480 ASPECT RATIO...16:9 TONE VOLUME...50% ECHO...NONE CHANNEL... BS HD BROADCAST EXECUTE RESERVED VIDEO RECORDING USING BUILT-IN TUNER FROM 1:15 PM TO 2:00 PM, JANUARY 1, 1999 |

PC → PERSONAL COMPUTER

EXAMPLE OF ATTRIBUTE INFORMATION USED IN PLUG & PLAY, ETC.

| STREAM ID | STREAM PROPERTY |
|---|---|
| ID=0 ··· DESIGNATE MAIN PICTURE | VIDEO COMPRESSION MODE (MPEG2, ETC.) |
| | TV SYSTEM (NTSC, PAL, ETC.) |
| | ASPECT RATIO (4:3, 16:9, ETC.) |
| | VIDEO RESOLUTION (720×480, ETC.) |
| ID=1 ··· DESIGNATE SOUND SOURCE | AUDIO CODING MODE (AC-3, MPEG1/2, MPEG2 WITH EXPANDED BITSTREAM, LINEAR PCM, ETC.) |
| | NUMBER OF QUANTIZATION BITS (16 BITS, ETC.) ON/OFF OF DYNAMIC RANGE CONTROL, ETC. |
| | SAMPLING FREQUENCY (48 kHz, ETC.) |
| | NUMBER OF AUDIO CHANNELS (1ch TO 8 ch, ETC.) |
| | APPLICATION FLAG (WHETHER OR NOT AUDIO DATA IN CHANNEL MODE DESIGNATED BY THE NUMBER OF AUDIO CHANNELS IS CONTAINED, ETC.) |
| | BIT RATE (FROM 64 kbps FOR AC-3/MPEG1 TO 1536 kbps FOR LINEAR PCM, ETC.) |
| ID=2 ··· DESIGNATE SUB-PICTURE | ATTRIBUTE OF SUB-PICTURE (CAPTION, MENU, CLOSED CAPTION, TELETEXT, ETC.) |
| | SUB-PICTURE COLOR PALLET (16 SETS OF LUMINANCE SIGNALS AND TWO PAIRS OF COLOR DIFFERENCE SIGNALS USED IN VOB OF INTEREST, ETC.) |
| ID=3 ··· DESIGNATE ADDITIONAL TEXT | DESIGNATE CHARACTER SET, ETC. |

FIG. 30

| TYPE CODE | TYPE DEPENDENT FIELD |
|---|---|
| EXAMPLE> | EXAMPLE OF FCP/1394AVC> |
| | CTS・C TYPE/RESPONSE・SUBUNIT TYPE・SUBUNIT ID・OPECODE・OPERAND・ADDITIONAL OPERAND (IF NECESSARY)・PADDING (IF NECESSARY) |
| 0 … HY TERMINAL CONFIRMATION PLUG & PLAY | <<CTS FIELD; ID OF COMMAND SET>> <br> 0 … IEEE1394AVC <br> 1 … OTHER COMMANDS |
| 1 … AUTHENTICATION・KEY EXCHANGE | <<C TYPE/FUNCTION CATEGORIES OF RESPONSE; COMMAND>> |
| 2 … CGMS-A INFORMATION TRANSFER | <COMMAND> <br> 0000 … CONTROL <br> 0001 … STATUS <br> 0010 … INQUIRY <br> 0011 … NOTIFY <br> 0100~0111 … RESERVED |
| 3 … DEVICE CONTROL SIMPLIFIED COMMAND | <RESPONSE> <br> 1000 … NOT IMPLEMENTED <br> 1001 … ACCEPTED <br> 1010 … REJECTED <br> 1100 … IMPLEMENTED/STABLE <br> 1101 … CHANGED <br> 1110 … RESERVED <br> 1111 … INTERIM |
| 4 … DEVICE CONTROL FCP/1394AVC | <<SUBUNIT TYPE; ADDRESS FOR SPECIFYING FUNCTION UNIT IN DEVICE>> <br> 00000 … MONITOR <br> 00001~00011 … RESERVED <br> 00100 … VCR <br> 00101 … TUNER <br> 00111 … CAMERA <br> 01000~11110 … RESERVED <br> 11111 … UNIT |
| 5 … DEVICE STATUS/PROPERTY INFORMATION | <<SUBUNIT ID; ADDRESS FOR DISTINGUISHING IDENTICAL SUBUNIT TYPE>> <br> FOR EXAMPLE, ID FOR DESIGNATING DECK NUMBER IN DOUBLE-DECK VCR |
| 6 … VIDEO ID/TELETEXT | <<OPECODE; COMMAND>> |
| 7 … ADDITIONAL INFORMATION CONTROL | <SUBUNIT ID FOR VCR> <br> C1h … LOAD MEDIUM <br> C2h … VIDEO RECORDING <br> C3h … REPRODUCTION <br> OTHER |
| 8 … STREAM ATTRIBUTE INFORMATION TRANSFER | <<OPERAND; PARAMETER OF COMMAND>> |

FIG. 32

DEVICE INTERCONNECT SYSTEM USING ANALOG LINE

CROSS-REFERENCE TO RELATED APPLICATIONS

This is a Continuation Application of PCT Application No. PCT/JP00/05647, filed Aug. 23, 2000, which was not published under PCT Article 21 (2) in English.

This application is based upon and claims the benefit of priority from the prior Japanese Patent Applications No. 11-242202, filed Aug. 27, 1999; No. 2000-054593, filed Feb. 29, 2000; No. 2000-054594, filed Feb. 29, 2002; and No. 2000-093927, filed Mar. 30, 2000.

BACKGROUND OF THE INVENTION

1. Field of the Invention

The present invention relates to a device interconnect system in which an information exchange method between a plurality of devices interconnected via an analog signal line is improved.

2. Discussion of the Background

Nowadays, video programs are supplied using analog media (VHS video, laser disk, ground broadcast, and the like) or digital media (DVD video, satellite broadcast, and the like) in a standard TV system (NTSC or the like). In a high-resolution TV system (HDTV), video programs are supplied using analog media (MUSE Hi-Vision satellite broadcast or the like). A digital HDTV system (for home use) has entered a practical stage.

When a video program signal is sent from a given device to another device, even when original source contents are digitally recorded, an analog line (composite or component) is currently used more prevalently than a digital line. In the future, a digital line will become the mainstream, but an analog line is projected to be used prevalently for home use for the time being.

Video devices are interconnected via an analog line, and various kinds of information (control command, service information, video ID, and the like) can be superposed on the vertical blanking interval (VBI) of a video signal (analog video signal) that flows in the analog line, thus improving user's convenience. However, when the contents of compatible VBI information differ in units of devices connected, the length and contents of information to be superposed on the VBI must be changed as needed.

SUMMARY OF THE INVENTION

The present invention has been made in consideration of the above situation, and has as its object to provide a device interconnect system which can transfer information of various contents and lengths that can be changed in correspondence with a connection partner using a video blanking interval (vertical blanking interval VBI) between devices which are interconnected via an analog video signal line.

In order to achieve the above object, in a device interconnect system according to the present invention, which transfers an analog video signal containing predetermined information (command information, additional information, video ID information, and the like) in a vertical blanking interval (VBI) between a plurality of devices (an STB with an HY terminal, VCR with an HY terminal, or the like serving as a master device/source device, and a VCR with an HY terminal, a TV with an HY terminal, or the like serving as a slave device/sink device) via an analog line, information (bits 1 to 20) having a word configuration (words 0 to 2+CRCC in FIG. 20) defined by a predetermined number of bits (variable within the range from 5 bits to 80 bits) is superposed in a predetermined period (e.g., 49.1 $\mu$s) of a predetermined line (line number 10 in FIG. 20 or L10 in FIG. 31) in the vertical blanking interval (VBI) at a predetermined clock (fsc/32 to fsc/2).

The predetermined clock (fsc/32 to fsc/2) is obtained by frequency-dividing (by ½ to 1/32) a color subcarrier frequency (fsc; about 3.58 MHz in NTSC) of an analog video signal which is transferred from a transmitting device (master device/source device) of the plurality of devices to a receiving device (slave device/sink device) of the plurality of devices or an upper limit frequency (fmax; about 3 MHz in home-use VHS video) of a luminance component (Y signal component) of the analog video signal. The predetermined number of bits (5 bits to 80 bits) of the information (bits 1 to 20) superposed on the predetermined line (line number 10 in FIG. 20) of the vertical blanking interval (VBI) can be changed in correspondence with a frequency-division ratio (½ TO 1/32) with respect to the color subcarrier frequency (fsc) or the upper limit frequency (fmax) of the luminance component.

The frequency-division ratio (½ to 1/32) can be changed in correspondence with contents (contents of command information, additional information, and the like) of the predetermined information which is transferred from the transmitting device (master device/source device) to the receiving device (slave device/sink device).

The predetermined information (command information, additional information, and the like) can be packetized in a predetermined format (FIG. 23). In this case, the frequency-division ratio (½ to 1/32) can be changed in correspondence with contents of the packet (contents of each layer level).

The vertical blanking interval (VBI) can contain text information (teletext/closed caption in FIG. 19). In this case, the frequency-division ratio (½ to 1/32) can be changed in correspondence with a partner (a text decoder (not shown) or the like) to which the text information is sent.

In a device interconnect system according to the present invention, the predetermined information (command information and the like) is exchanged in a packet format (FIG. 23) consisting of a plurality of layer levels between a plurality of devices (an STB with an HY terminal, VCR with an HY terminal, or the like serving as a master device/source device or via an analog line, and a VCR with an HY terminal, a TV with an HY terminal, or the like serving as a slave device/sink device). Information used to confirm a type of a transmitting device (master device/source device) of the plurality of devices or a receiving device (slave device/sink device) of the plurality of devices is stored in a predetermined layer (layer level 4) of the packet format, and information depending on the type (type dependent field) is stored in a layer (layer level 5) lower than the predetermined layer (layer level 4) of the packet format.

In a device interconnect system according to the present invention, an information pack (synchronization+payload+CRCC) having a predetermined word configuration (REF+words 0 to 2+CRCC in FIG. 20) is superposed on a predetermined line (L10 in FIG. 31) in the vertical blanking interval (VBI), and an information packet containing a packet header, a type code, and a type dependent field is formed by a set of one or more information packs (synchronization+payload+CRCC).

Note that the packet header (FIG. 31) of the information packet can contain version number information, packet size information, and command/response identification information used to identify a command and a response to the command.

The predetermined information (command information and the like) can be exchanged in a packet format (FIG. 23, FIG. 31) consisting of a plurality of layer levels between the transmitting device (master device/source device) and receiving device (slave device/sink device), and the version number information, the packet size information, the command/response identification information, the type code, and the type dependent field can belong to different layer levels of the plurality of layer levels.

The information packet (packet header+type code+type dependent field in FIG. 31) can have a common format (layer levels 1 to 5 in FIG. 23), and various kinds of information (various existing commands, newly expanded commands, and the like) can be exchanged using the common format between the transmitting device (master device/source device) and receiving device (slave device/sink device).

The predetermined information (command information and the like) can be exchanged in a packet format (FIG. 23) consisting of a plurality of layer levels between the transmitting device (master device/source device) and receiving device (slave device/sink device); the version number information can belong to a layer level different from the packet size information, the command/response identification information, the type code, and the type dependent field of the plurality of layer levels; and contents or the number of layer levels of the plurality of layer levels can be changed in accordance with the version number information (layer level 1 in FIG. 23).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention, in which:

FIG. 1 is a diagram for explaining a device interconnect system (an example in which a digital signal is encoded) according to an embodiment of the present invention;

FIG. 2 is a table for explaining an example of the correspondence between the line numbers of a video blanking interval (VBI) and the status in the system according to the embodiment of the present invention;

FIG. 3 is a table for explaining an example of the correspondence between the scramble-encode (encryption) types and processing contents for a component analog signal and the like in the system according to the embodiment of the present invention;

FIG. 5 is a diagram for explaining a device interconnect system (an example in which an analog signal is encoded) according to another embodiment of the present invention;

FIG. 8 is a diagram for explaining a device interconnect system (arrangement including not only scramble/descramble but also command processing) according to still another embodiment of the present invention;

FIG. 15 is a view for explaining an example of the format of transfer information (including command information) transferred between analog signal information processing devices in the system shown in FIGS. 8 to 11;

FIG. 16 is a table for explaining an example of commands contained in information transferred in the format shown in FIG. 15;

FIG. 20 is a view for explaining the signal format of various kinds of information (command information, service information, video ID information, and the like) superposed on line numbers 10 to 20 (or 273 to 283) in FIG. 19;

FIG. 21 is a table exemplifying related processes of HD image quality analog copy protect and SD image quality copy protect taking standard image quality (SD) video and high-resolution/high image quality (HD) video in Japan and U.S.A. as an example;

FIG. 23 is a table for explaining the packet format of information exchanged between interconnected devices in a device interconnect system according to an embodiment of the present invention;

FIG. 24 is a table for explaining an example (authentication/key exchange) of the contents of layer level 4 (type) in the packet format shown in FIG. 23;

FIG. 25 is a table for explaining another example (device control) of the contents of layer level 4 (type) in the packet format shown in FIG. 23;

FIG. 26 is a table for explaining the contents of an analog copy generation management system (CGMS-A) that can be used in a device interconnect system according to an embodiment of the present invention;

FIG. 27 is a view for explaining the flow of commands and responses in a function control protocol (FCP) used in command/status shown in FIG. 25;

FIG. 28 is a table for explaining the configuration of simplified commands (when type=device control) shown in FIG. 25;

FIG. 29 is a table for explaining an example of device information used in plug & play or the like of layer level 4 (type) in the packet format shown in FIG. 23;

FIG. 30 is a table for explaining an example of attribute information used in plug & play or the like of layer level 4 (type) in the packet format shown in FIG. 23;

FIG. 32 is a table for explaining the relationship between type codes and type dependent fields which form the payload information in FIG. 31.

DETAILED DESCRIPTION OF THE INVENTION

Figure 4:
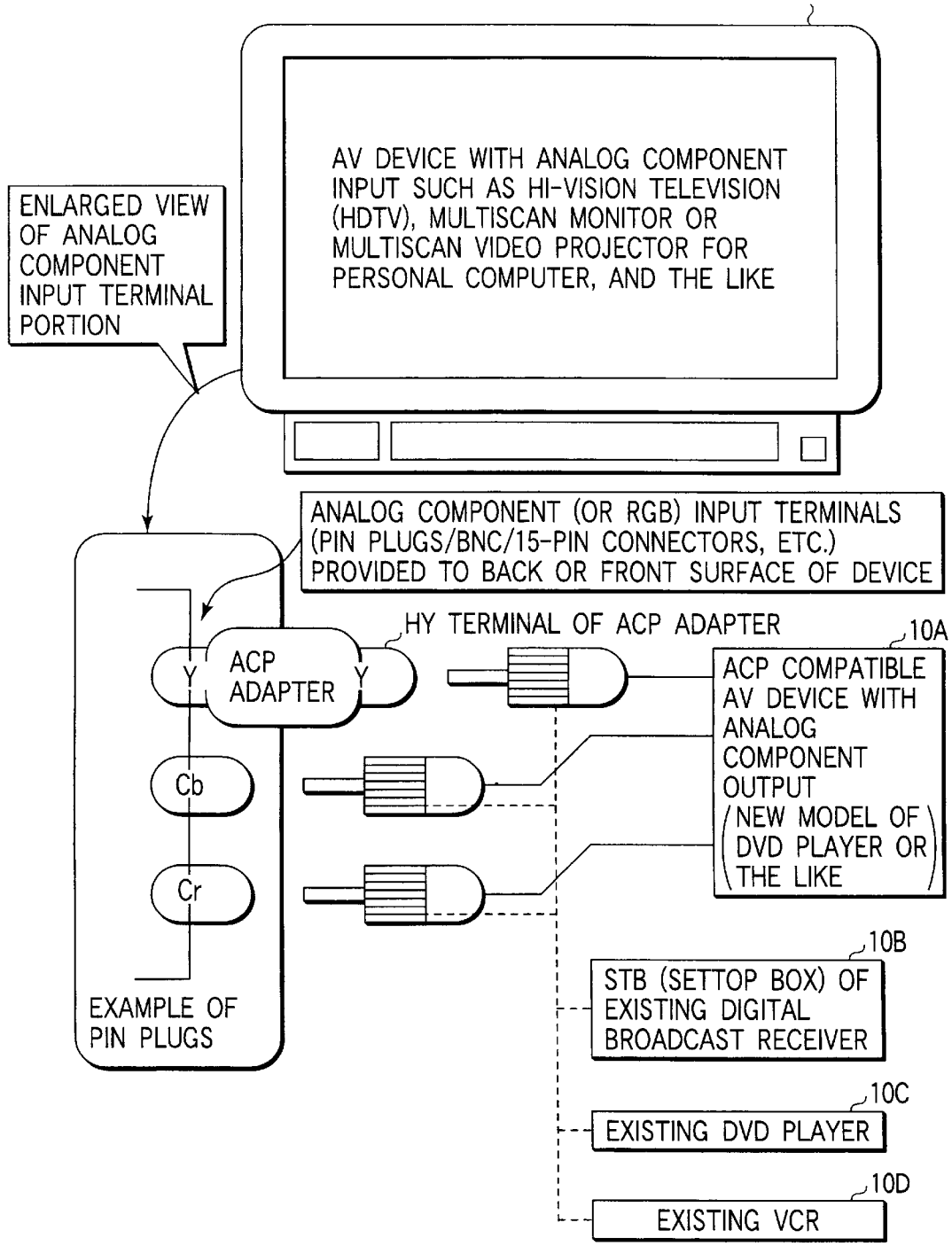
FIG. 4 is a view for explaining an example of how to use an analog copy protect (ACP) adapter built in the system according to the embodiment of the present invention with respect to an existing AV device.

A device interconnect system according to an embodiment of the present invention will be explained below with reference to the accompanying drawings.

FIG. 1 is a diagram for explaining an analog copy protect (ACP) system which can be used in a device interconnect system according to the present invention. In this embodiment, a video signal undergoes encoding including scrambling while it is a digital signal.

More specifically, a digital component video signal (progressive signal at high scan rate and the like) S10 reproduced by a DVD video player or the like is scrambled (encoded) by scrambler (encoder) 100 on the basis of encode information (scramble information, service information, and the like). This encode process can include a process for superposing various kinds of information (command information, service information, and the like) on vertical blanking information VBI of the scrambled video signal as needed.

Scrambled digital video component signal (containing various kinds of information in VBI; see FIGS. 15, 16, 19, 20, and 22 to 32) S12 is converted into corresponding analog component video signal S20 by DAC 102.

Analog component video signal (which contains VBI on which various kinds of information are superposed, and are scrambled) S20 from DAC 102 is guided to analog component video (Y/Cb/Cr) output terminal HY1 (hybrid Y terminal 1) via contact s (send) of switch SW10.

In the arrangement shown in FIG. 1, scrambler (encoder) 100, DAC 102, authentication key exchange unit/encryption key generation unit 104 (to be described later), switch SW10, and terminal HY1 construct transmitter 10 on the source device (DVD video player or the like) side.

Analog component video signal S20 from terminal HY1 is sent to analog component video (Y/Cb/Cr) input terminal HY2 (hybrid Y terminal 2) of receiver 30 on the sink device (HDTV or the like) side via signal cable (for example, a component connection cable that bundles three independent coaxial cables into one cable or an optical cable) 20.

Analog component video signal S20 received at terminal HY2 is supplied to descrambler 300 via contact r (receive) of switch SW20.

Descrambler 300 sends authentication information contained in VBI of received signal S20 to authentication key exchange unit 104 via authentication key exchange unit/ encryption key generation unit 304, contact s (send) of switch SW20, cable 20, contact r (receive) of switch SW10 of transmitter 10.

Note that switches SW10 and SW20 can be switched at timings synchronous with transfer of VBI (i.e., synchronous with video frames). During these switching timings, VBI information transferred can be temporarily stored in internal memories (not shown) of authentication key exchange unit/ encryption key generation units 104 and 304, or encoder 100 and decoder 300.

Authentication key exchange unit/encryption key generation unit 104 of transmitter 10 sends received authentication information and an encryption key to scrambler 100. Scrambler 100 that has confirmed a partner (receiver 30) using this authentication information superposes encryption key information used to descramble on VBI, and sends it to descrambler 300 via cable 20.

Descrambler 300 reconstructs a decryption key used in scramble on the partner (transmitter 10) side on the basis of the received encryption key information (together with the already received authentication information in some cases), and descrambles (decodes) scrambled analog component video signal S20 using this decryption key. This decode process can include processes based on various kinds of information (commands and the like in FIG. 16) superposed on VBI.

Note that authentication key exchange unit/encryption key generation unit 104 of transmitter 10 and authentication key exchange unit/encryption key generation unit 304 of receiver 30 construct key information exchange means for exchanging key information used to descramble scrambled information via terminals HY1 and HY2.

Normal analog component video signal S30 that has been descrambled by descrambler 300 is supplied to internal circuit 500 of sink device (high-resolution multiscan monitor or the like represented by HDTV) via external connection portion 40.

When the sink device is an existing home-use device, external connection portion 40 comprises a set of three RCA type pin plugs (Y/Cb/Cr for a DVD component signal or Y/Pb/Pr for a Hi-Vision component signal).

On the other hand, when the sink device is an existing professional-use device, external connection portion 40 normally comprises a set of three to five BNC type connectors (corresponding to Y/Cb/Cr or Y/Pb/Pr in case of three connectors, or corresponding to R/G/B/H sync/V sync in case of five connectors).

Alternatively, when the sink device is an existing multiscan personal computer monitor, external connection portion 400 often comprises a set of five BNC connectors or a multi-connector having two or three lines of 15 to 23 pins.

Note that most prevalent external connection portion 40 for a home-use device is RCA type pin plugs for a component video signal. A video signal circuit of the component RCA pin plug terminals can process signals (various kinds of information on VBI) according to the present invention.

Also, as an external connection portion 40 for a home-use device, an S terminal is prevalenty used. A circuit for luminance signal Y of this S terminal can process signals (various kinds of information on VBI) according to the present invention.

The following explanation will be given assuming that the sink device is an existing home-use model comprising RCA type plugs.

In the arrangement in FIG. 1, descrambler (decoder) 300, authentication key exchange unit/encryption key generation unit 304, switch SW20, and terminal HY2 construct receiver 30 on the sink device (HDTV or the like) side.

Analog copy protector ACP incorporates the functions and arrangement of receiver 30.

When sink device 50 is an existing HDTV or the like and does not have any HY2 terminal, receiver 30 is manufactured as an ACP adapter, and is firmly attached to external connection portion (normally, RCA type pin plugs) 40 of sink device 50.

Alternatively, when sink device 50 is a multiscan monitor (or multiscan projector) comprising an input interface board, the circuit function of receiver (ACP adapter) 30 can be built in this input interface board (not shown).

Alternatively, when sink device 50 is a personal computer comprising an AV input interface board, the circuit function of receiver (ACP adapter) 30 can be built in this AV input interface board (not shown).

On the other hand, when sink device 50 is a new model based on the present invention, and has an HY2 terminal, the circuit function of the receiver (ACP adapter) 30 can be built in an internal circuit board (not shown) of this sink device 50.

An ACP adapter (receiver 30 in FIG. 1) for making an existing HDTV or the like compatible to an HY terminal must not be detachable from connection portion 40 of sink device 50. This is because analog component video signal S30 at connection portion 40 may be illicitly copied since it has been descrambled.

To prevent illicit copies, the following measures may be taken:

(01) A service person of a dealer attaches an ACP adapter to sink device (existing HDTV or the like) 50 (to prevent the ACP adapter from being attached to a video recording device by a third party); and

(02) A measure is taken to make the ACP adapter attached by the service person undetachable from sink device 50 (the ACP adapter is designed to be physically or circuit-functionally destroyed if a third party tries to forcibly detach the ACP adapter).

When an ACP adapter is fixed to a sink device having only one set of component video inputs, it is often inconvenient for the user unless a normal component video signal can also be input to those inputs.

To avoid such inconvenience, the following measures may be taken:

(11) The HY2 terminal of the ACP adapter and RCA pin plugs are compatibly designed in terms of the circuit impedance, video signal level, and physical size of the connection portion;

(12) When a normal video signal (standard image quality/SD image quality video signal; including a signal scrambled by the Macrovision scheme) is input to the HY2 terminal, the ACP adapter passes through the normal video signal; and

(13) When an analog video signal that has undergone special scrambling other than the Macrovision scheme (e.g., high-resolutionhigh image quality/HD image quality analog video signal) is input to the HY2 terminal, the ACP adapter executes a descramble process (and predetermined command processes and the like) of the signal.

FIG. 2 is a table for explaining an example of the correspondence between the line numbers of the blanking interval (vertical blanking interval VBI) of a video signal and the status in the system according to the embodiment of the present invention.

Transmission information when transmitter 10 in FIG. 1 challenges (accesses) receiver 30 is inserted in lines 10 and 273 is inserted. Also, reception information when receiver 30 responds to transmitter 10 in FIG. 1 is inserted in lines 11 and 274 of VBI.

Information inserted in lines 10/11 and 273/274 of VBI can contain information exchanged between authentication key exchange units/encryption key generation units 104 and 304 in FIG. 1. With this information exchange, transmitter 10 can confirm that a partner (receiver 30; slave in this case) that transmitter 10 has challenged is a device that can be connected to the self device (transmitter 10; master in this case), and can exchange key information upon descrambling.

VBI data (see (c) to (e) of FIG. 15, control commands in FIG. 16; various kinds of information in FIGS. 23 to 32) other than the device authentication/key exchange information can be inserted in lines 12 to 21 and 275 to 284 of VBI.

Of these VBI lines 12 to 21 and 275 to 284, lines 12 to 19 and 275 to 282 are used to transport an analog copy protect signal (AGC pulse) of the aforementioned Macrovision scheme in case of a normal analog video signal. However, since the present invention also assumes an analog video signal that cannot be copy-protected, VBI lines 12 to 21 and 275 to 284 can be used to insert control commands and the like of the present invention.

FIG. 3 is a table for explaining an example of the correspondence between the scramble (encryption) types and processing contents for a component analog signal and the like in the system according to the embodiment of the present invention.

A scramble method for an analog component video signal is not limited to one type, but various types of scramble processes may be used.

As type 1, a scramble process for randomly inverting the polarities (inverting the phases) of only chroma signals (Cb/Cr) of Y/Cb/Cr is known.

As type 2, a scramble process for randomly inverting the polarity (inverting the phase) of only a luminance signal (Y) of Y/Cb/Cr is known.

As type 3, a scramble process for randomly inverting the polarities (inverting the phases) of all Y/Cb/Cr is known.

As type 4, a scramble process for randomly replacing a luminance signal (Y) and chroma signals (Cb/Cr) of Y/Cb/Cr is known.

Furthermore, as type n, a scramble process for randomly inverting the polarities of signals (R/G/B signals, Y/C signals of an S terminal, or the like) other than Y/Cb/Cr or randomly replacing them is known.

Alternatively, as type n, a scramble process for randomly replacing original horizontal/vertical sync signals with other unrelated sync signals is known.

The random inversion/random replacement period (refresh interval) of types 1 to 4 (or type 1 to n) can be set in units of frames (e.g., every ⅟₆₀ sec) or in units of predetermined times (e.g., 0.4 to 1.2 sec corresponding to the VOBU interval of DVD video). This refresh interval may be fixed (e.g., 1 sec).

Information for identifying and designating types 1 to 4 (or types 1 to n) can be inserted in lines 10/11 and 273/274 of VBI (or somewhere in lines 12 to 21 and 275 to 284) in FIG. 2.

FIG. 4 is a view for explaining an example of how to use the ACP adapter built in the system according to the embodiment of the present invention with respect to an existing AV device (corresponding to sink device 50 in FIG. 1).

AV device 50 in FIG. 4 includes an HDTV, multiscan monitor or projector for a personal computer, and the like, which automatically tracks high-resolution video inputs at high scan rates (31.5 kHz, 33.7 kHz, and the like) in addition to NTSC video inputs at a normal scan rate (15.75 kHz).

The analog component video inputs of this AV device (sink device) 50 comprise a set of three RCA type pin terminals (corresponding to external connection portion 40 in FIG. 1) which are juxtaposed vertically, as shown in, e.g., FIG. 4.

The ACP adapter in FIG. 1 is firmly attached to a luminance signal (Y) input portion of these three terminals (so as not to be detached once it is attached). A Y signal plug from a source device (corresponding to transmitter 10 in FIG. 1) is (detachably) attached to hybrid Y terminal HY (corresponding to HY2 in FIG. 1) of this ACP adapter.

As shown in FIG. 4, the ACP adapter attached once to the Y input of sink device 50 can no longer be detached, and breaks if someone tries to forcibly detach it.

Cb/Cr signal plugs from the source device are respectively attached to color difference signal (Cb/Cr) input portions of AV device (HDTV) 50 (Cb/Cr signal plugs may be detachable).

The ACP adapter in FIG. 4 comprises a terminal (HY) structure for accepting an analog video signal from an ACP compatible source device (AV device 10A) and a terminal (RCA) structure inserted in input terminals of a sink device (AV device 50).

In addition to ACP compatible (with HY terminal) AV devices (a new model of a DVD video player with progressive analog component video outputs, and the like), the source device includes the following ACP incompatible devices (without HY terminal):

settop box (STB) 10B of an existing digital broadcast receiver;

existing DVD video player 10C; and existing VCR or DVC (with analog component video outputs) 10D.

When a scrambled analog video signal is output from these existing source devices (without HY terminal), and is input to the ACP adapter attached to AV device 50, the ACP adapter directly inputs the scrambled analog video signal to AV device 50 as it is.

In this case, since AV device 50 receives the scrambled analog video signal, a normal video image is not displayed on the screen of AV device (HDTV) 50.

If the signal is scrambled by analog copy protect of the aforementioned Macrovision scheme, a normal video image is displayed on the screen of AV device (HDTV) 50. However, if this AV device 50 is a home-use video recorder (VCR of, e.g., VHS), video recording of a video signal protected by the Macrovision scheme is disturbed.

Note that the ACP adapter in FIG. 4 can be designed so "an NTSC or PAL analog component signal of a normal resolution, which is scrambled by Macrovision or the like" passes through it without the use of any authentication/key information.

The aforementioned HY terminal can be applied to luminance/color separation connection (S terminal connection) or composite connection (using RCA or BNC type connectors) in addition to component connection of Y/Cb/Cr (or Y/Pb/Pr).

FIG. 5 is a diagram for explaining a device interconnect system according to another embodiment of the present invention. In this embodiment, a video signal is scrambled while it is an analog signal.

That is, digital component video signal (progressive signal at high scan rage and the like) S10 reproduced by a DVD video player or the like is converted into corresponding analog component video signal S14 by DAC 102A.

Analog signal S14 is scrambled (encoded) by scrambler 100A on the basis of encode signal (scramble information) from scramble key generation unit 104A.

Scrambled analog component video signal (containing VBI on which various kinds of information shown in FIGS. 15, 16, and 23 to 32 are superposed) S20 is guided to analog component video (Y/Cb/Cr) output terminal HY1 (hybrid Y terminal 1) via contact 1 (send) of switch SW11.

Analog component video signal S20 from terminal HY1 is sent to analog component video (Y/Cb/Cr) input terminal HY2 (hybrid Y terminal 2) of receiver 30 on the sink device (HDTV or the like) side via signal cable (for example, a component connection cable that bundles three independent coaxial cables into one cable or an optical cable) 20.

Analog component video signal S20 received at terminal HY2 is supplied to descrambler 300A via contact 1 (receive) of switch SW21.

On the other hand, encode signal (scramble information) SE from scramble key generation unit 104A is supplied to terminal HY1 via contact 2 (send) of switch SW11.

Encode signal SE from terminal HY1 is sent to terminal HY2 of receiver 30 on the sink device (HDTV or the like) side via signal cable 20. Encode signal SE received at terminal HY2 is supplied to scramble key reception unit 304A via contact 2 (receive) of switch SW21.

Scramble key reception unit 304A supplies decode signal (key information for descrambling scrambled information) DE corresponding to received encode signal (scramble information) SE to descrambler 300A.

Descrambler 300A temporarily stores received decode signal (descramble key) DE, and descrambles (decodes) scrambled analog component video signal (containing VBI on which various kinds of information shown in FIGS. 15, 16, and 23 to 32 are superposed) S20 sent from scrambler 100A on the source device side on the basis of the contents (decode information) of stored decode signal DE.

Note that switches SW11 and SW21 can be switched at timings synchronous with the vertical blanking interval (i.e., synchronous with video frames). The encode signal (scramble information) transferred during these switching timings can be temporarily stored in an internal memory (not shown) of scramble key reception unit 304A or descrambler 300A.

Normal analog component video signal S30 descrambled by descrambler 300 is supplied to internal circuit 500 of sink device ((high-resolution multiscan monitor or the like represented by HDTV) 50 via external connection portion 40 which cannot be detached once it is attached.

Figure 6:
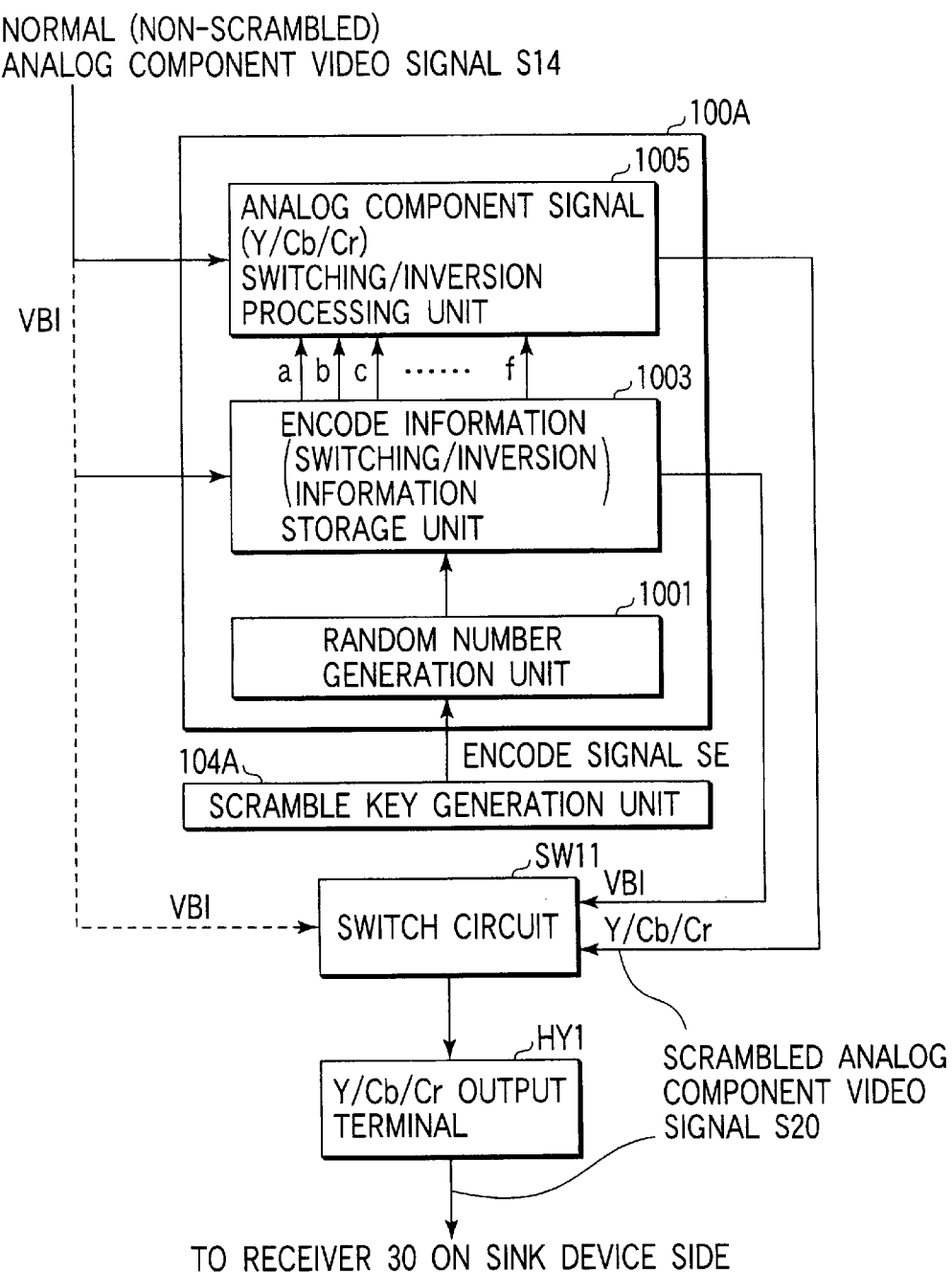
FIG. 6 is a block diagram for explaining an example of the arrangement of an encoder (scrambler for an analog component signal) in the system in FIG. 5.

FIG. 6 is a diagram for explaining an example of the arrangement of the encoder (scrambler for an analog component signal) in the system shown in FIG. 5.

Encode signal SE from scramble key generation unit 104A is input to random number generation unit 1001 in scrambler 100A as a default value of random number generation. In random number generation unit 1001, an M-sequence random number generator generates a random number (serving as a basis of scramble information or encryption key information) in synchronism with the timing of the horizontal blanking interval or vertical blanking interval (VBI) on the basis of the input default value (SE). The generated random number is supplied to encode information storage unit 1003 in scrambler 100A.

Encode information storage unit 1003 can be constructed by, e.g., a 6-bit (a to f) shift register and six latches (flip-flop circuits). After the random number is read by the shift register while being bit-shifted, a bit sequence (a to f) of the read information (0/1) is latched.

The latch timing can be the same as, e.g., the transfer timing of VBI (or the timing of a vertical sync signal). In this case, the contents of the shift register can be changed at the transfer period of VBI.

When a random number is generated with reference to horizontal scans, the latch timing may be adjusted to the horizontal scan timing (or the timing of a horizontal sync signal). In this case, the contents of the shift register can be changed at the line number switching period in VBI.

The bit sequence (a to f) latched by encode information storage unit 1003 is supplied as scramble information (encryption key information) to analog component video signal switching/inversion processing unit 1005 in scrambler 100A.

Switching/inversion processing unit 1005 receives non-scrambled (non-encrypted) analog component video signal S14.

Switching/inversion processing unit 1005 performs switching (replacement) and/or polarity inversion (phase inversion) of Y/Cr/Cb analog component video signal S14 on the basis of the bit sequence (a to f) latched by encode information storage unit 1003 at that time, thus scrambling signal S14 (an example of signal switching/inversion processing unit 1005 will be described later with reference to FIG. 12).

Scrambled analog component video signal S20 is sent to terminal HY1 via switch circuit SW11.

The bit sequence (a to f) as scramble information (encryption key information) is selected by switch SW11 during the vertical blanking interval (VBI) of signal S20, and is sent as a part of VBI information to terminal HY1.

In the arrangement in FIG. 6, six signals (a to f) transferred from encode information storage unit 1003 to analog component video signal switching/inversion processing unit 1005 are switched in units of scan lines (horizontal scans or vertical scans) of an analog video signal in synchronism with the timings of horizontal scan lines of analog video inputs (S14), but maintain a given value in each scan line of the analog video signal.

Analog component video signal switching/inversion processing unit 1005 performs polarity inversion and/or replacement of signals among a luminance Y signal, color difference U signal (or Cr signal), and color difference V signal (or Cb signal) in units of scan lines of the analog video signal in correspondence with information (a to f) from encode information storage unit 1003, thus encoding (scrambling-encoding) analog video signal information.

Encrypted analog video signal information (S20 containing VBI on which various kinds of information are superposed) is transferred to terminal HY1 via switch circuit SW11.

Figure 7:
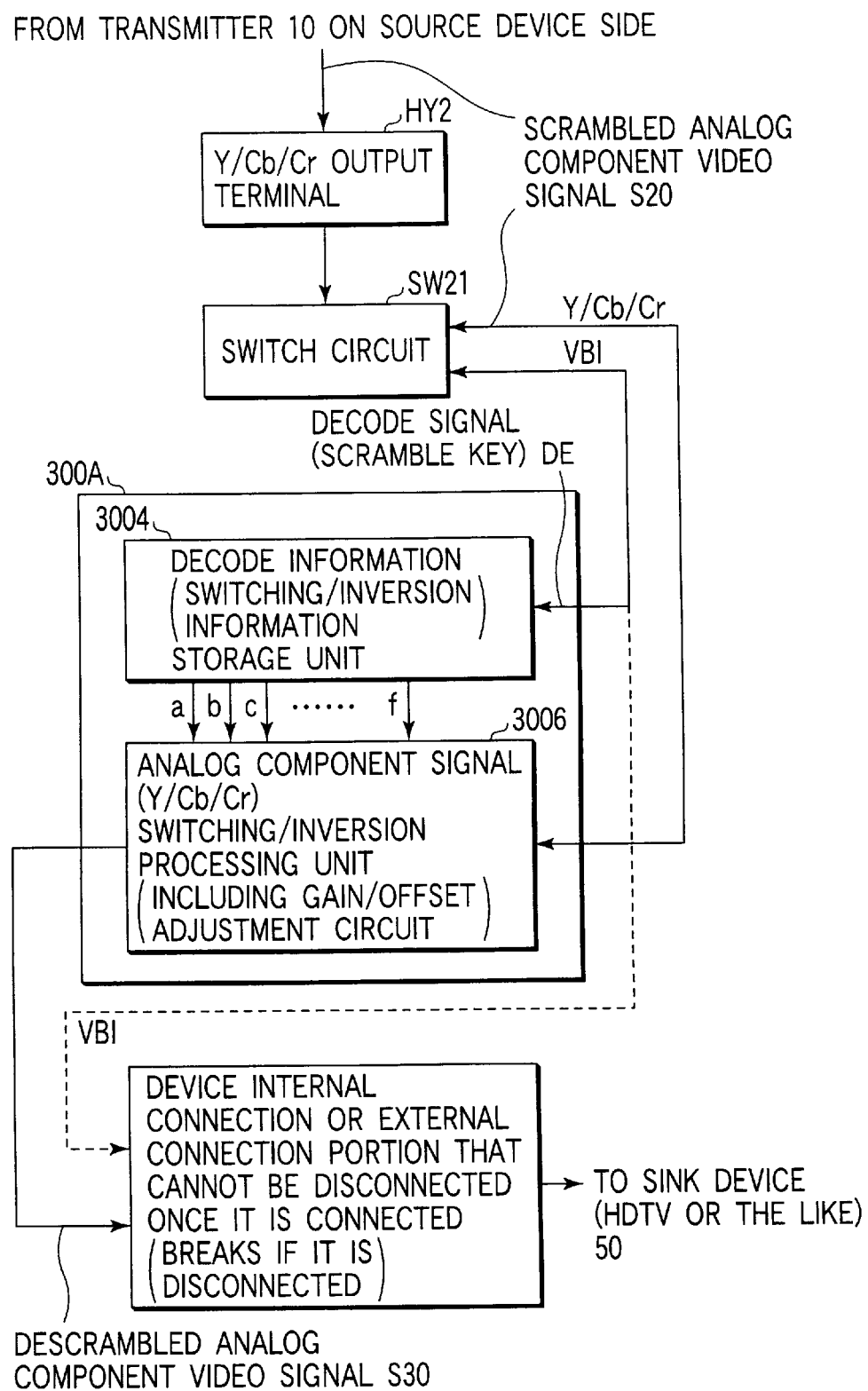
FIG. 7 is a block diagram for explaining an example of the arrangement of a decoder (descrambler for an analog component signal) in the system in FIG. 5.

FIG. 7 is a diagram for explaining an example of the arrangement of the decoder (descrambler for an analog component signal) in the system in FIG. 5.

Analog component video signal (scrambled) S20 sent from transmitter 10 and information VBI in its vertical blanking interval is input to switch SW21 via terminal HY2.

Switch SW21 segments signal S20 into video information part (Y/Cb/Cr) and VBI part at the timing of VBI.

Information (corresponding to a bit sequence (a to f) used in encode) of decode information DE contained in the VBI segmented by switch SW21 is fetched by decode information storage unit 3004 of descrambler 300A, and is temporarily stored until next signal DE is sent.

The video information part (Y/Cb/Cr) of signal S20 segmented by switch SW21 is input to analog component signal switching/inversion processing unit 3006 of descrambler 300A.

Signal switching/inversion processing unit 3006 decodes (descrambles) the video information part (Y/Cb/Cr) of scrambled analog component video signal S20 on the basis of the decode information (bit sequence (a to f) used in encode) temporarily stored in storage unit 3004 to restore an original signal format (an example of signal switching/inversion processing unit 3006 will be described later with reference to FIG. 13).

The analog component video signal descrambled (decoded) in this way is supplied to sink device 50 in FIG. 5 via external connection portion 40 that cannot be detached once it is connected.

Note that the VBI segmented by switch SW21 also contains various kinds of VBI information (information exemplified in FIGS. 15, 16, and 23 to 32) that can be used by sink device 50. If decoder 300A adopts a circuit arrangement in which an analog component video signal (Y/Cb/Cr) from signal switching/inversion processing unit 3006 does not correctly contain such VBI information, such VBI information may be independently sent to sink device 50 via connection portion 40.

FIG. 8 is a diagram for explaining a device interconnect system (arrangement including not only scramble/descramble but also command processes) according to still another embodiment of the present invention. FIG. 8 shows a transmission system constructed by connecting a plurality of analog signal information processing devices to which the present invention is applied.

Figure 9:
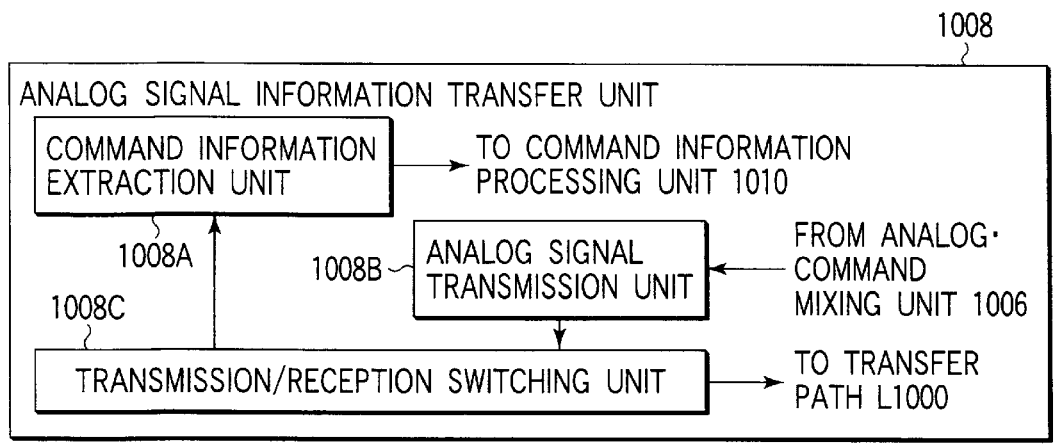
FIG. 9 is a diagram exemplifying the internal arrangement of analog signal information transfer unit 1008 in the system in FIG. 8.
Figure 10:
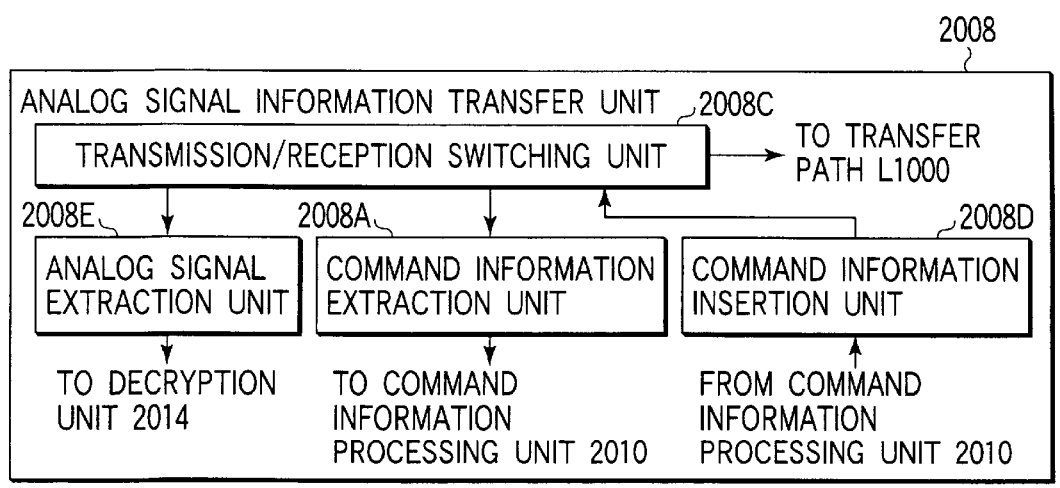
FIG. 10 is a diagram exemplifying the internal arrangement of analog signal information transfer unit 2008 in the system in FIG. 8.
Figure 11:
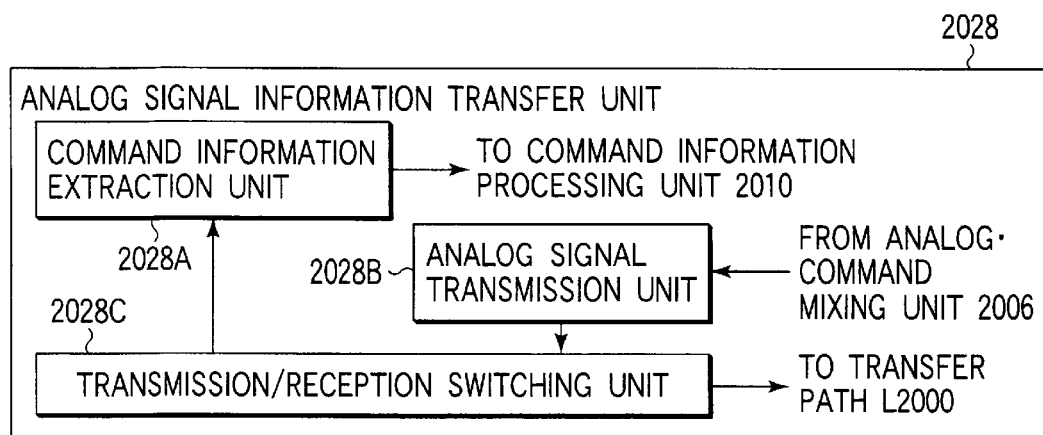
FIG. 11 is a diagram exemplifying the internal arrangement of analog signal information transfer unit 2028 in the system in FIG. 8.

In this system, FIGS. 9, 10, and 11 respectively exemplify the internal arrangements of analog signal information transfer units 1008, 2008, and 2028.

Referring to FIG. 8, analog signal information processing device 1000 is a key station for transmitting an analog video signal which is to be protected from illicit copies and the like by superposing various kinds of information (VBI information exemplified in FIGS. 15, 16, and 23 to 32) thereon. As such a key station, a cable TV broadcast station or radio (ground or satellite broadcast) TV broadcast station is known.

Note that analog signal information processing device 1000 can correspond to transmitter 10 in FIG. 1 or 5.

Analog signal processing device 2000 is a device that integrates a TV receiver or STB (settop box) with a TV for screen display.

Note that analog signal information processing device 2000 can partially correspond to receiver 30 in FIG. 1 or 5.

Furthermore, analog signal information processing device 3000 is a recording device with analog signal inputs such as a recordable/reproducible optical disk device (e.g., a DVD real-time video recording device), VCR (video cassette recorder)/DVC (digital video cassette), or the like. This analog signal information processing device 3000 records an encrypted (scrambled) analog signal as it is.

Other analog signal information processing devices 4000 and 5000 are further connected to analog signal information processing device 2000 via analog signal information transfer path L2000.

In analog signal information processing device 1000 as a cable or radio TV station, a video signal to be broadcasted. is output from analog video signal generator 1002, is encrypted (encoded) by analog signal encryption unit 1004, and is transferred to analog signalcommand information mixing unit 1006.

Note that analog signal encryption unit 1004 (and 2004 to be described later) can correspond to scrambler 100 in FIG. 1 or scrambler 100A in FIGS. 5 and 6.

Encryption key information used in encryption at that time is generated by encryption key information generation unit 1012. At the same time, encryption key information generation unit 1012 generates information required for descrambling (decrypting/decoding) the key of an analog signal in analog signal information processing device 2000 on the basis of the generated encryption key information, and transfers it to command information processing unit 1010.

Command information processing unit 1010 converts the transferred information required for descramble (decryption/decode) into a command format for transfer. The generated command information is mixed with the previously encrypted analog video signal information on the time axis in analog signal command information mixing unit 1006.

The information obtained by mixing the encrypted analog video signal information and command information is sent from transmission/reception switching unit 1008C (FIG. 9) onto analog signal information transfer path L1000 via analog signal transmission unit 1008B (FIG. 9) in analog signal information transfer unit 1008.

Note that transmission/reception switching unit 1008C (FIG. 9) can correspond to SW10 in FIG. 1 or SW11 in FIG. 6.

Analog signal information transfer path L1000 is an optical cable or coaxial cable of CATV or the like in case of wired communications. In case of wireless communications, analog signal information transfer path L1000 is a radio broadcast path such as ground or satellite broadcast wave or the like.

Analog signal information transfer path L1000 is a two-way communication path. This path L1000 can be any one of 1-wire type for a composite video signal, 2-wire type for an S video signal, and 3-wire type for a component video signal.

Transmission/reception switching unit 1008C (FIG. 9) can switch the transmission and reception systems with respect to analog signal information transfer path L1000 as needed by time division or frequency multiplexing.

That is, upon transmission, analog signal information transferred from analog signal transmission unit 1008B (FIG. 9) is transmitted onto analog signal information transfer path L1000; upon reception, command related information sent back via analog signal information transfer path L1000 is transferred to command information extraction unit 1008A (FIG. 9).

Command information extraction unit 1008A interprets information contents sent from transmission/reception switching unit 1008C (FIG. 9) to extract a return value (status) with respect to a command, and interprets command contents and parameters sent from analog signal information processing device 2000 to transfer the interpretation result to command information processing unit 1010.

Command information processing unit 1010 in FIG. 8 executes a process in accordance with the current state (status) of the analog signal information processing device 2000 side and request contents from analog signal information processing device 2000 on the basis of information sent from command information extraction unit 1008A (FIG. 9).

Command information processing unit 1010 generates a new command for analog signal information processing device 2000 if necessary in accordance with its processing state, makes analog signal command information mixing unit 1006 mix the generated command information with analog signal information, and transfers that information to analog signal information processing device 2000 via analog signal transmission unit 1008B (FIG. 9) and transfer path L1000.

As one of command information exchange processes, related information that pertains to an encryption key used in a mutual authentication process and decryption between analog signal information processing devices is exchanged.

The encrypted analog video signal information and command information transferred via analog signal information transfer path L1000 are input to analog signal information transfer unit 2008 of analog signal information processing device 2000.

As described above, analog signal information transfer path L1000 allows two-way communications, and transmission information from analog signal information processing device 2000 can be transferred to analog signal information processing device 1000 via command information insertion unit 2008D (FIG. 10) and analog signal information transfer path L1000. In this case, transmission/reception is switched by transmission/reception switching unit 2008C (FIG. 10).

Analog signal information extraction unit 2008E (FIG. 10) extracts the encrypted analog signal information from the information received by analog signal information processing device 2000, and command information extraction unit 2008A (FIG. 10) extracts the command information therefrom.

The extracted command information on the receiving side is interpreted by command processing unit 2010. When a reply command to analog signal information processing device 1000 or a return value (status) with respect to the previously received command must be sent back, that information is sent from command information processing unit 2010 to command information insertion unit 2008D (FIG. 10), and is sent back to analog signal information processing device 1000 via transmission/reception switching unit 2008C (FIG. 10) and analog signal information transfer path L1000.

Before decrypting (decoding) the encrypted analog video information signal, when mutual authentication required for sharing a common encryption key between, e.g., analog signal information processing devices 1000 and 2000 is made, a plurality of two-way command exchange processes are required between analog signal information processing devices 1000 and 2000.

When encryption key information generation unit 2012 in analog signal information processing device 2000 generates an encryption key, analog signal decoding unit (decryption unit) 2014 descrambles/decodes (decrypts) the encrypted analog video signal information from analog signal information extraction unit 2008E (FIG. 10) using this encryption key.

The decrypted (decoded) analog video signal information is displayed on analog video information display unit 2016 (CRT display or liquid crystal display for displaying a video image of a normal NTSC signal, PAL signal, or the like). Display unit 2016 can correspond to the monitor of sink device 50 in FIG. 1 or 5.

Note that analog signal decryption unit (decoder) 2014 and analog signal encryption unit (encoder) 2004 in FIG. 8 can basically have the same internal arrangement. That is, encryption unit (encoder) 2004 can have the same arrangement as that of scrambler (encoder) 100A in, e.g., FIG. 6. Analog signal decryption unit (decoder) 2014 can have the same arrangement as that of descrambler (decoder) 300A in, e.g., FIG. 7.

Furthermore, analog signal information transfer unit 2028 in FIG. 8 has the same internal arrangement, as can be seen from comparison with FIGS. 9 and 11. The internal arrangement of analog signal information transfer unit 2028 will be described later in the description of the flow chart in FIG. 14.

Figure 12:
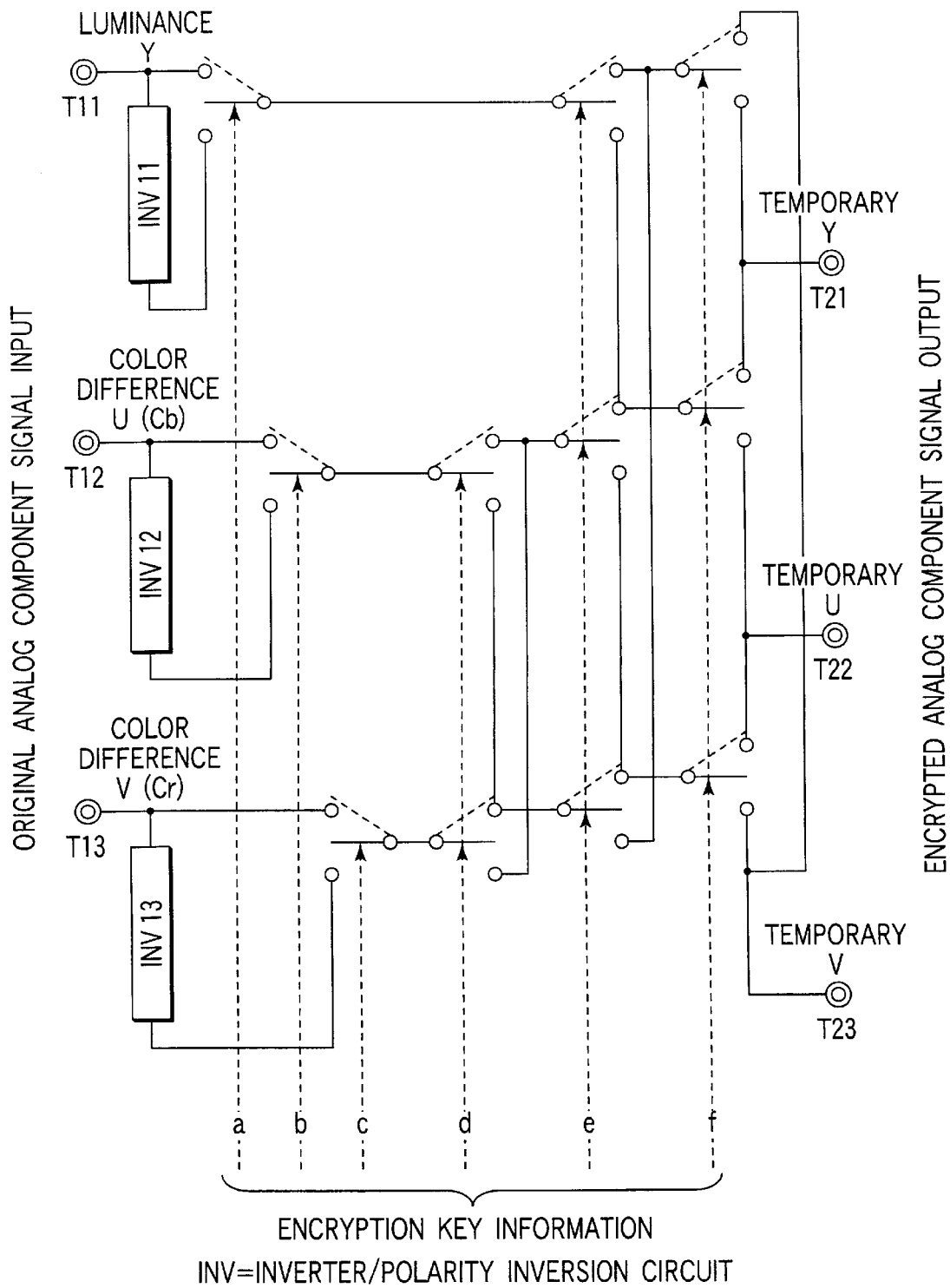
FIG. 12 is a diagram for explaining an example of the relationship between the encryption process of an analog signal (switching/inverting process of a component signal) and an encryption key (scramble key/encode information) in the system shown in FIGS. 5 to 11.

FIG. 12 is a diagram for explaining an example of the relationship between the encryption process of an analog signal (switching/inverting process of a component signal) and an encryption key (scramble key/encode information) in the system shown in FIGS. 5 to 11.

Assume that analog component video signal switching/inversion processing unit 1006 in FIG. 6 has an arrangement shown in FIG. 12.

In this case, luminance Y, color difference U (Cb), and color difference V (Cr) signal components of non-scrambled source analog component video signal S14 are respectively supplied to terminals T11 to T13 in FIG. 12. The polarities of the luminance Y, color difference U (Cb), and color difference V (Cr) signal components supplied to these terminals are inverted by inverters (polarity inversion circuits) INV11 to INV13. These luminance Y, color difference U (Cb), and color difference v (cr) signal components and their polarity inverted signals are supplied to terminals T21 to T23 via a switch circuit shown in FIG. 12.

The selection states of switches in FIG. 12 are determined by encryption key information defined by a sequence of six bits a to f. If the respective switches have selection states indicated by the dotted lines in FIG. 12 in accordance with the sequence of six bits a to f, the Y signal at terminal T11 is guided to terminal T23 (temporary V terminal), the U (Cb) signal at terminal T12 is guided to terminal T21 (temporary Y terminal), and the V (Cr) signal at terminal T13 is guided to terminal T22 (temporary U terminal).

If signals are not scrambled, temporary Y=Y. temporary U=U (Cb), and temporary V=V (Cr). But since they are scrambled by the circuit of this example, temporary Y=U (Cb), temporary U=V (Cr), and temporary V=Y.

The encrypted analog video signal information (temporary Y, temporary U, temporary V) is transferred to terminal HY1 in FIG. 6.

In the above example, the polarities of Y, U (Cb), and V (Cr) components are not inverted, but Y, U (Cb), and V (Cr) components, the polarities of which are inverted as needed, can be output to terminals T21 to T23 depending on the contents of the sequence of bits a to f.

The sequence of bits a to f is obtained from encode information storage unit 1003 in FIG. 6. The contents (0/1) of the sequence of bits a to f are switched (maintained to be given values within each scan line) in units of scan lines (horizontal or vertical) of an analog video signal in synchronism with the timings of horizontal scan lines of an analog signal input (S14).

Figure 13:
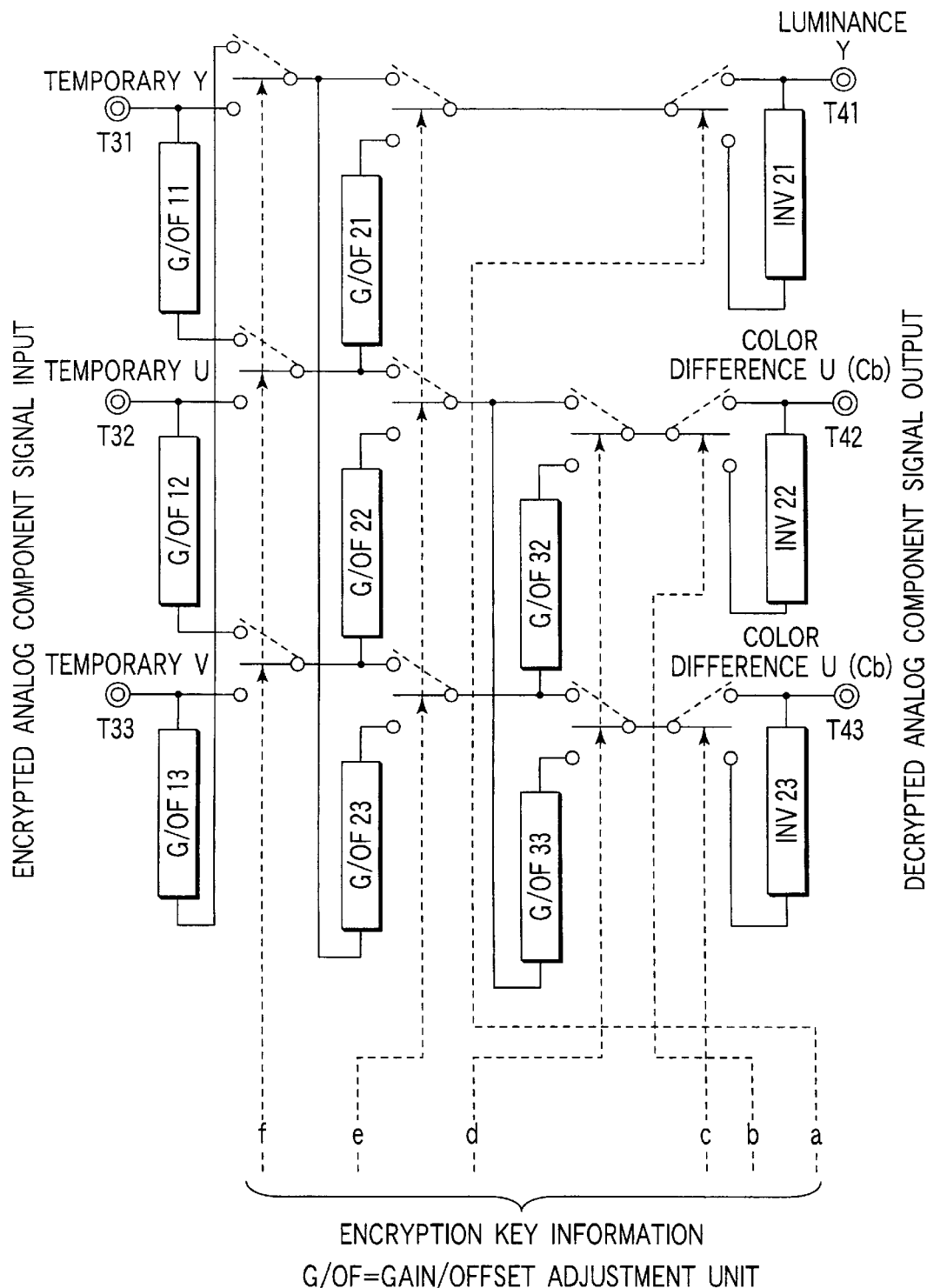
FIG. 13 is a diagram for explaining an example of the relationship between the decode/decryption (descramble) process of an encrypted (scrambled) analog component signal and a decryption key (scramble key/decode information) in the system shown in FIGS. 5 to 11.

FIG. 13 is a diagram for explaining an example of the relationship between the decode/decryption (descramble) process of an encrypted (scrambled) analog component signal, and a decryption key (scramble key; decode information) in the system shown in FIGS. 5 to 11.

Assume that the analog component video signal switching/inversion processing unit 3006 in FIG. 7 has an arrangement as shown in FIG. 13.

In this case, encrypted analog video signal information components (temporary Y, temporary U, temporary V) from terminals T21 to T23 in FIG. 12 are respectively supplied to terminals T32 to T33 in FIG. 13.

At this time, encryption key information (a sequence of six bits a to f) used to scramble video signal information components (temporary Y, temporary U, temporary V) supplied to terminals T32 to T33 is transferred to and stored in decode information storage unit 3004 in FIG. 7 in VBI of that video signal. The sequence of six bits a to f stored in decode information storage unit 3004 determines the switch selection state of a switch circuit in FIG. 13.

In case of the switch selection state exemplified in FIG. 13, a temporary Y component (U (Cb) in the example in FIG. 12) supplied to terminal T31 passes through gain/offset adjustment unit G/OF 11, and is then guided to terminal T42 via the switch circuit in the illustrated state.

A temporary U component (V (Cr) in the example in FIG. 12) supplied to terminal T32 passes through gain/offset adjustment unit G/OF 12, and is then guided to terminal T43 via the switch circuit in the illustrated state.

Likewise, a temporary V component (Y in the example in FIG. 12) supplied to terminal T33 passes through gain/offset adjustment unit G/OF 13, and is then guided to terminal T41 via the switch circuit in the illustrated state.

In this way, Y, U (Cb), and V (Cr) signals of the source analog component video signal are respectively output to terminals T41, T42, and T43 in FIG. 13.

Note that G/OF 11 of G/OF 33 in FIG. 13 have an offset adjustment function of restoring the pedestal level (black level) of a signal, which does not match the original level due to inversion processes of NV 11 to NV 23, and a gain adjustment function of adjusting any amplitude deviation from the pedestal level to the signal peak level due to different signal attenuation factors in transfer paths to an original amplitude. If the pedestal level/peak level of each of Y/Cb/Cr deviates, the white balance of the decoded video signal is disturbed, and the tincture of the original video signal cannot be reproduced.

Each of G/OF 11 to G/OF 33 can be basically constructed by one high-speed operational amplifier comprising a gain adjustment resistor circuit. The gain adjustment resistor circuit can use a FET, the drain-to-source path internal resistance of which changes in response to a voltage applied to the gate. That is, the gain of the high-speed operational amplifier can be adjusted by controlling the drain-to-source path internal resistance of the FET by its gate voltage.

To attain offset correction, a DC bias can be applied to the input side of the high-speed operational amplifier. A resistance control gate voltage application unit and offset DC bias voltage supply unit in the FET are connected to an MPU (not shown) in the analog signal information processing device via a DAC (not shown).

Prior to an encryption (encode)/decryption (decode) process, a reference video signal is supplied via analog signal information transfer path L1000 or L2000 in FIG. 8, and the internal resistance control gate voltage and offset DC bias voltage of each FET are automatically adjusted by the MPU to optimize the operation values in G/OF 11 to G/OF 33.

Note that G/OF 11 to G/OF 33 in FIG. 13 are required in an analog scramble/descramble process, but are not required in a digital scramble/descramble process (for example, in the arrangement show in FIG. 1, an input signal passes through DAC 102 in transmitter 10, and a DAC is provided at the output side of a descrambled video signal in digital decoder 300 of receiver 30).

Since a high-resolution video signal has a very broad baseband, it is hard for the prior art to attain baseband level encryption. However, since arrangements shown in FIGS. 12 and 13 use only analog switches (the gain/offset adjustment speed can be lower than the inversion speed of each inverter) as high-speed devices required for encryption, high-speed analog baseband encryption can be realized.

Note that high-speed analog switches can use inexpensive ones used in large quantities in an automatic teller machine (ATM) or the like.

In addition, since the encoder (scramble) and decoder (descramble) have a very small circuit scale, as shown in FIGS. 6, 7, 12, and 13, an inexpensive, compact encryption/decryption circuit for an analog signal can be manufactured.

Figure 14:
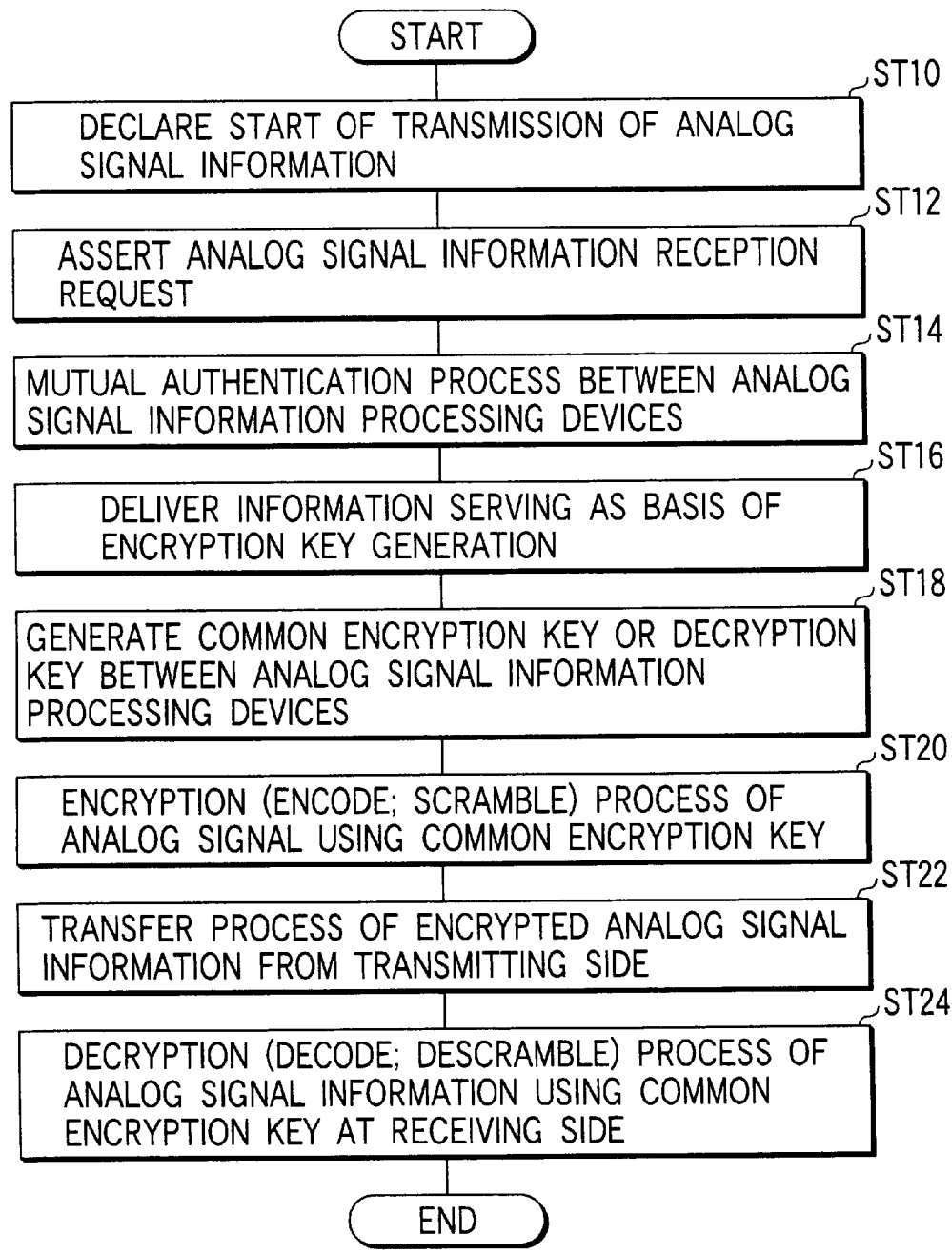
FIG. 14 is a flow chart for explaining an example of a transfer process of an encrypted (scrambled) analog signal and encryption key (a to f in FIGS. 6 and 7, FIGS. 12 and 13) in the system shown in FIGS. 5 to 11.

FIG. 14 is a flow chart for explaining an example of the transfer process of an encrypted (scrambled) analog signal and encryption key (e.g., a to f in FIGS. 6 and 7 or FIGS. 12 and 13) in the system shown in FIGS. 5 to 11.

This transfer process assumes a case wherein when a plurality of analog signal information processing devices (3000 to 5000) are connected to one analog signal information processing device (2000) (via HY terminals), as shown in FIG. 8, a predetermined one device (e.g., 3000) is selected, and the analog signal information processing device (2000) sends analog video information to the selected device (3000).

Note that two-way transfer path L2000 that connects a plurality of analog signal information processing devices (3000 to 5000) and one analog signal information processing device (2000) is not limited to analog component connection, but may use a conventional composite type analog video cable or an analog video cable for an S terminal.

Command information processing unit 2010 in FIG. 8 generates a "SLOT_ID command (use "Slot_ID Create" in FIG. 16)" to declare the start of transfer of an analog video signal. The "SLOT_ID command" is sent from analog signal.command information mixing unit 2006 onto analog signal information transfer path L2000 via analog signal transmission unit 2028B (FIG. 11) and transmission/reception switching unit 2028C (FIG. 11), thus declaring the start of transmission of analog signal information (step ST10).

The SLOT_ID command contains as parameters analog signal information transmission declaration information, and receiving device designation information indicating recording device 3000 in this process.

Upon receiving this command, analog signal information processing device 3000 issues SLOT_ID (an ID used to identify sessions that require different transfer processes) corresponding to an analog video signal information transfer process, and makes an analog signal information reception request assertion (step ST12).

In order to confirm if a device (one of 3000 to 5000 in FIG. 8) that has made the analog signal information reception request assertion is a "partner analog signal information processing device 2000 which wants to transfer the signal", a mutual authentication process is done between analog signal information processing devices 2000 and 3000.

More specifically, the mutual authentication process is done by a challenge & response process in which information encrypted by public key information possessed by only analog signal information processing device 3000 is sent from analog signal information processing device 2000 to analog signal information processing device 3000, it is checked if analog signal information processing device 3000 can decrypt that information, and processes opposite to the aforementioned processes are then executed (step ST14).

Upon completion of the mutual authentication process, information as a basis of encryption key generation is delivered (step ST16), and an encryption key or decryption key common to the analog signal information processing devices is generated (step ST18).

For example, such method includes:

a) a method of exchanging a part of an encryption key (base information for encryption generation) simultaneously with the challenge & response process executed in step ST14, and generating an encryption key based on the exchanged information;

b) a method of sharing information as a basis of an encryption key in advance between analog signal information processing devices 2000 and 3000, and generating a common encryption key based on information sent from one of devices 2000 and 3000; and the like.

After an encryption key is generated by encryption key information generation unit 2012 via the aforementioned processes, analog signal encryption unit 2004 encrypts (encodes/scrambles) analog video information decrypted by analog signal decryption unit 2014 using another encryption key again (step ST20).

The encrypted analog video signal information obtained in step ST20 is mixed with command information generated by command processing unit 2010 by analog signalcommand information mixing unit 2006.

The mixed information is transferred to analog signal information processing device 3000 via analog signal transmission unit 2028B (FIG. 11), transmission/reception switching unit 2028C (FIG. 11), and transfer path L2000 (step ST22).

Analog signal information processing device 3000 decrypts (decodes/descrambles) the encrypted analog video signal information using a common encryption key (step ST24), and records the decrypted analog video signal information on an information storage medium (not shown; DVD-RAM disk, magnetic tape, or the like).

Note that the present invention is not limited to the aforementioned specific example, but a method of directly recording encrypted analog video signal information on an information storage medium is available.

In the above description, as an example of the common encryption key, information of a sequence of bits a to f in FIGS. 6 and 7 may be used.

(a) to (e) in FIG. 15 show an example of the format of transfer information (containing command information) TI transferred between the analog signal information processing devices in the system shown in FIGS. 8 to 11.

In this example, command information is transferred during the 10th to 13th and 17th to 20th scan line periods in the vertical blanking interval VBI between neighboring video information transfer periods VTP.

Upon assigning transfer users to these periods, a Slot_ID generation start declarer is granted a right to determine a specific period, and that assignment is reported using a Command Line Control command (FIG. 16).

However, in case of simple command transfer that merely exchanges one command and return value (status) without parallelly processing a plurality of commands at the same time, the command sender side repetitively sends an identical command four times using the 10th to 13th scan lines.

Also, in this case, a command status replier (that returns a return value) repetitively sends back identical contents using the 17th to 20th scan lines.

Command information is transferred using a 272-bit data packet DP structure. Actual command information is set in 176-bit command data block CDB, and information such as a slot ID; SLID that designates a unique session, a transmission device ID; TRID used to recognize a source device, a receiving device ID; REID for designating a destination, command code CMCD indicating command contents, command parameter CMPR indicating information that pertains to that command, and the like can be sent so as to simultaneously and parallelly execute a plurality of commands.

Since command data block CDB has a very small size (176 bits), large-size information must be divisionally transferred if it is transferred in the command format. For this reason, single command serial number SCSN is also transferred to indicate the number of times of transfer of information that pertains to a single command.

In FIG. 15, line 10/273 in the vertical blanking interval (VBI) can contain command information issued by the master side (this side), and line 11/274 can contain command information issued by the slave side (partner side).

FIG. 16 shows an example of various commands contained in information transferred in the format shown in FIG. 15.

Figure 17:
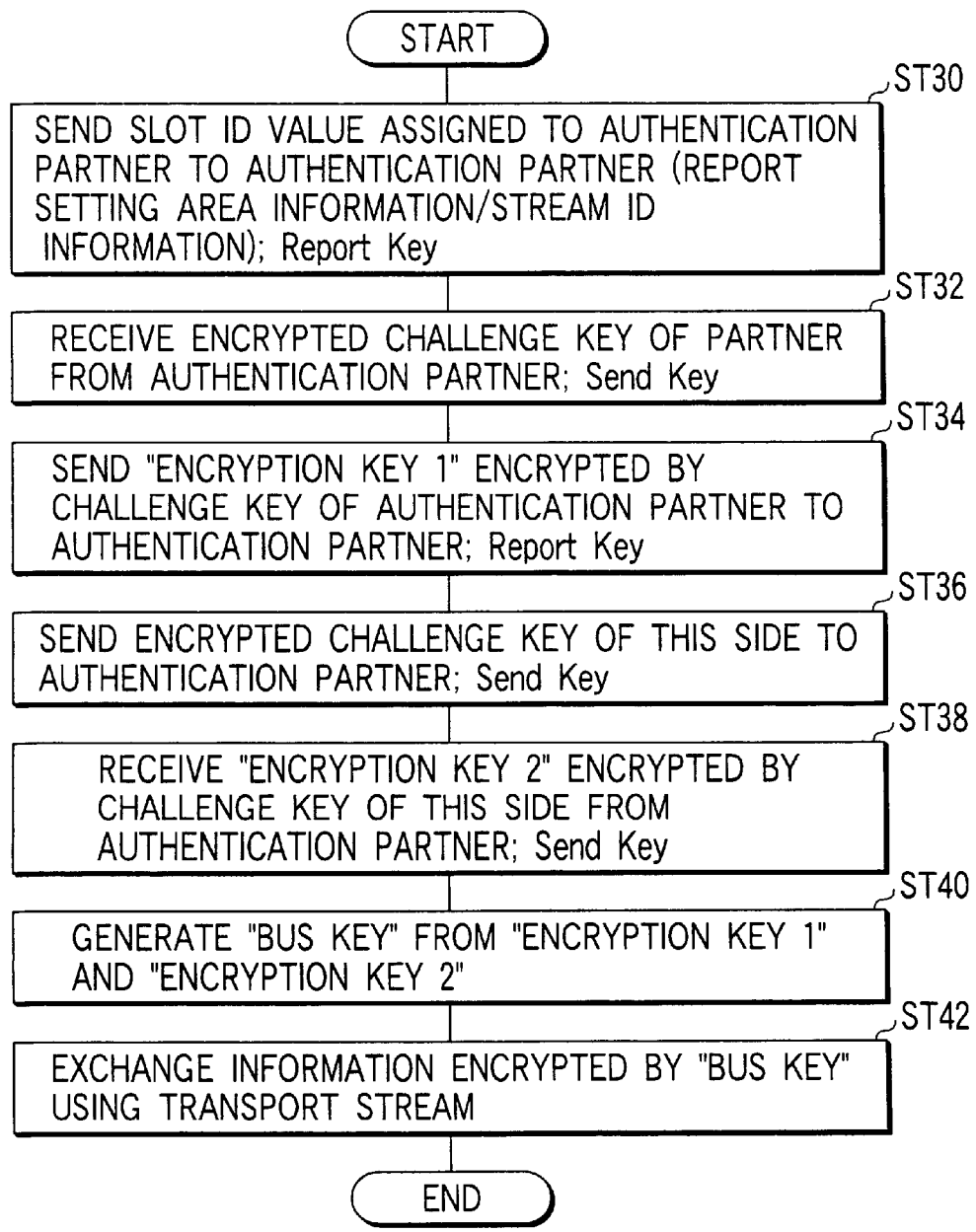
FIG. 17 is a flow chart for explaining an example of processes upon making mutual authentication between analog signal information processing devices in the system shown in FIGS. 8 to 11.

FIG. 17 is a flow chart for explaining an example of the process upon making mutual authentication between analog signal information processing devices in the system shown in FIGS. 8 to 11.

This process uses command information shown in FIG. 16.

A slot ID value assigned to an authentication partner is sent to the authentication partner (step ST30). At this time, setting area information and stream ID information are reported. In this case, a report key is used as a command.

An encrypted challenge key of the partner is received from the authentication partner (step ST32). In this case, a send key is used as a command.

"Encryption key 1" encrypted using the challenge key of the authentication partner is sent to the authentication partner (step ST34). In this case, a report key is used as a command.

An encrypted challenge key of this side is sent to the authentication partner (step ST36). In this case, a send key is used as a command.

"Encryption key 2" encrypted using the challenge key of this side is received from the authentication partner (step ST38). In this case, a send key is used as a command.

After "encryption key 1" and "encryption key 2" are obtained in this manner, a "pass key" is generated from these keys (step ST40).

After that, information encrypted using the "pass key" is exchanged using transport streams (step ST42).

Figure 18:
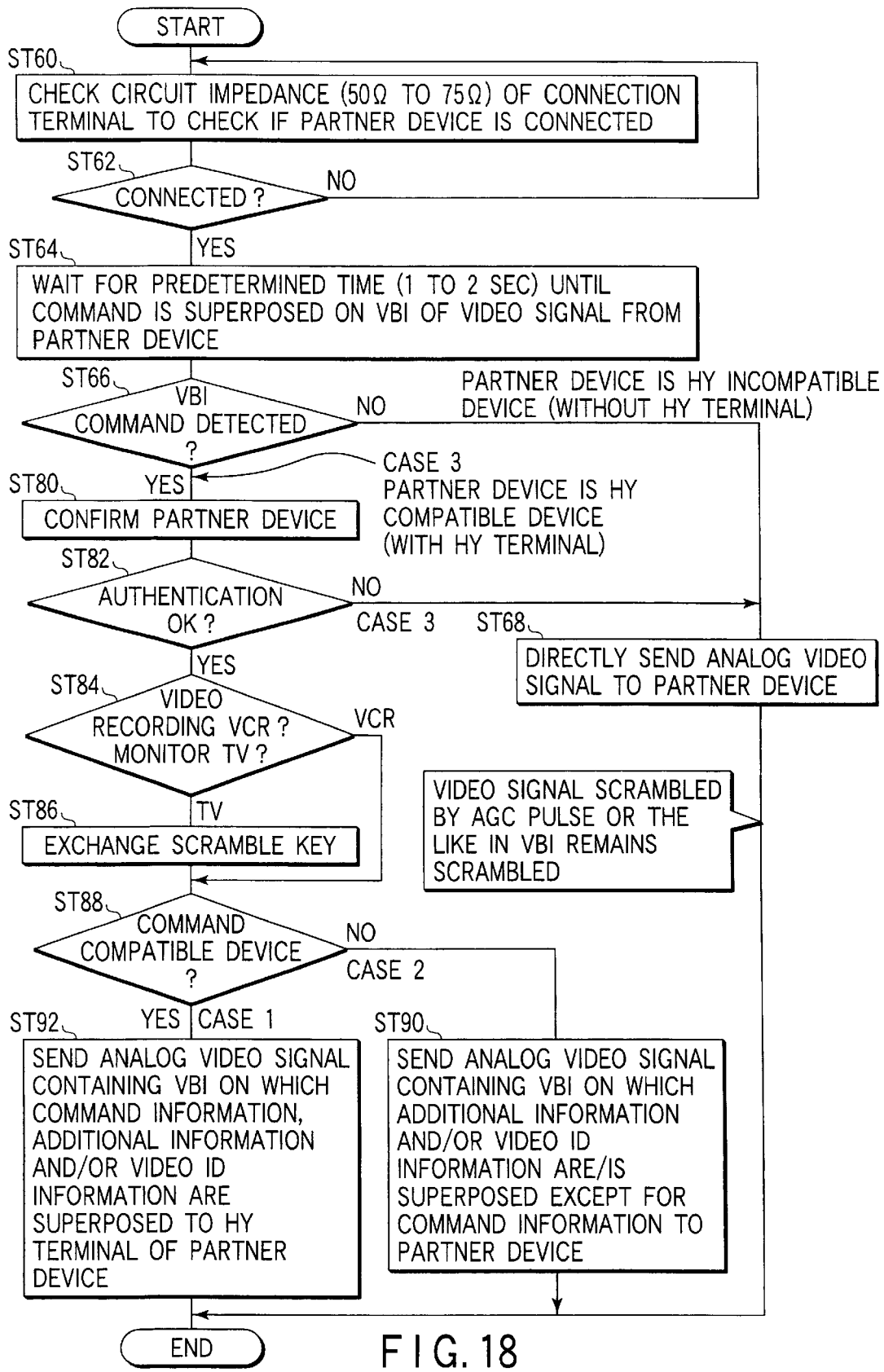
FIG. 18 is a flow chart for explaining an example of the operation of a device interconnect system according to an embodiment of the present invention.

FIG. 18 is a flow chart for explaining an example of the operation of the device interconnect system according to the embodiment of the present invention.

The circuit impedance (normally, 75 Ω, but may be 50 Ω depending on the connection partner) of the connection partner is checked to check if the partner device is connected (to the HY terminal of this device) (step ST60).

If no device is connected (the circuit impedance is several kΩ or higher or nearly infinity), the control waits until a device is connected (NO in step ST62).

If a device is connected (YES in step ST62), the control waits for a predetermined period of time (e.g., 1 to 2 sec) until a command is superposed on VBI of a video signal coming from the partner device (step ST64).

After an elapse of the predetermined period of time, a command on VBI is checked (step ST66).

If no command is detected (NO in step ST66; case 2), it is determined that the partner device is a conventional device (without any HY terminal) which is incompatible to the system of the present invention, and an analog video signal is directly sent (step ST68). That is, a scrambled analog video signal is sent to the partner device while it remains scrambled.

On the other hand, if a command is contained in VBI, it is determined that the partner device is a new model (with an HY terminal) compatible to the system of the present invention, and the model of the partner device is confirmed (step ST80).

This confirmation (authentication of the partner device) can be attained by checking if data corresponding to command information part CI in FIG. 15(c) is superposed.

If authentication of the partner device has failed due to, e.g., mismatch between data superposed on VBI and predetermined contents (NO in step ST82; case 3), it is determined that the partner device cannot execute an appropriate process in the system of the present invention, and an analog video signal is directly sent to the partner device (step ST68). That is, a scrambled analog video signal is sent to the partner device while it remains scrambled.

If authentication of the partner device has succeeded (YES in step ST82), it is checked if the authentic partner device is a device which has a video recording function (VCR or the like) or a device which does not have any video recording function (monitor TV or the like) (step ST84).

The checking process in step ST84 can be attained based on a partner device ID (receiving device ID in this case; see device type IDs in the reply-side device column of FIG. 29) in FIG. 15(e) contained in data packet DP in FIG. 15(c).

If the partner device is a TV or the like (there is no fear of illicit video recording), a scramble key is exchanged (step ST86).

If the partner device is a VCR or the like (there is a fear of illicit video recording), a scramble key exchange process (step ST86) is skipped.

It is then checked if the partner device is a command compatible device (step ST88).

Figure 31:
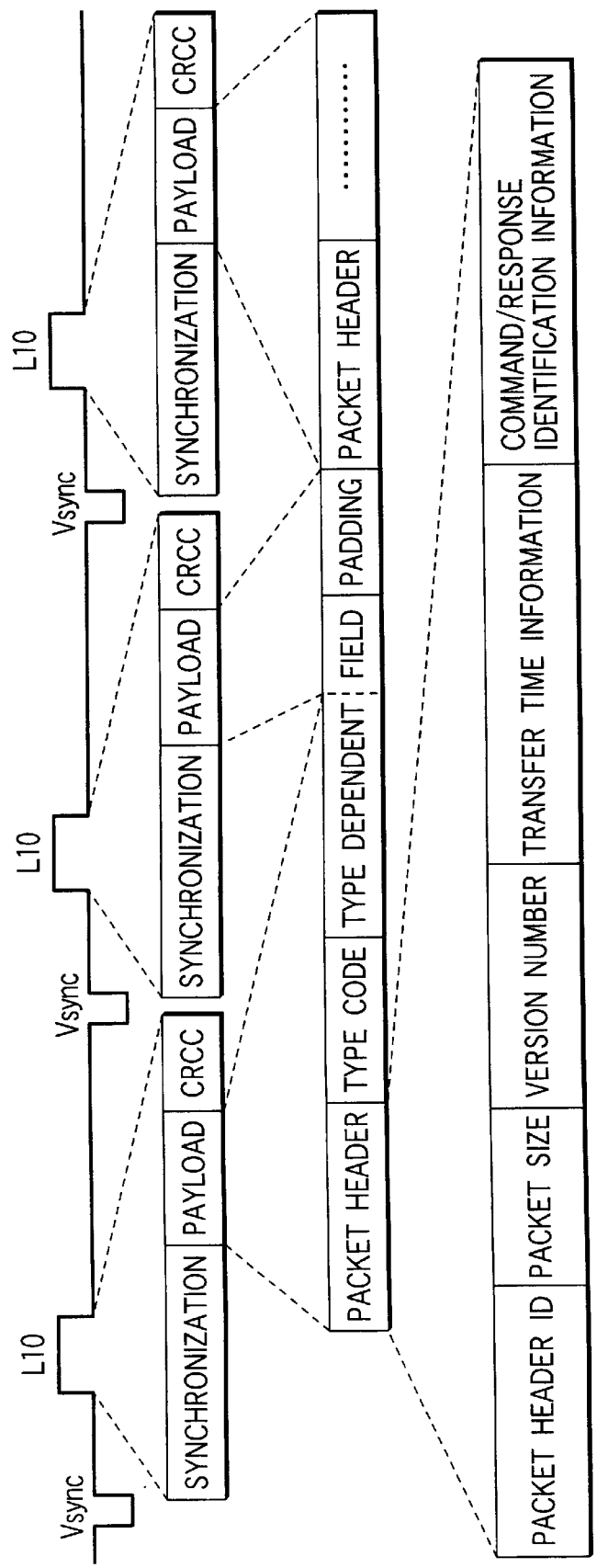
FIG. 31 is a view for explaining the format of payload information superposed on line number 10/273 (or 11/284) in FIG. 19.

The checking process in step ST88 can be attained based on a part of command information part CI (see type code/type dependent field in payload of FIG. 31; FIG. 32) contained in data packet DP in FIG. 15(c).

Figure 19:
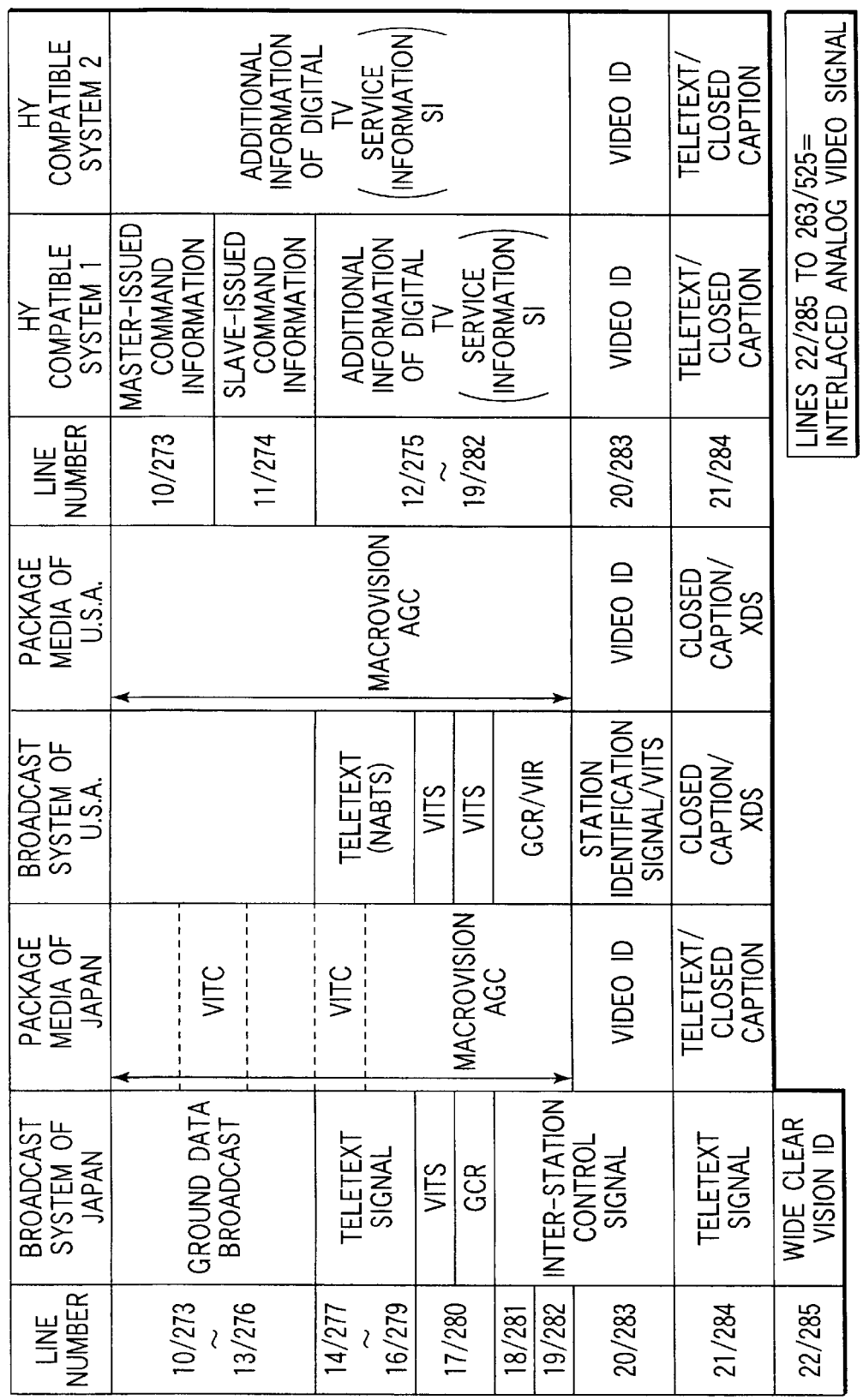
FIG. 19 is a table for explaining the contents in broadcast systems/package systems in Japan and U.S.A., and a system of the present invention.

If the partner device is not a command compatible device (NO in step ST88; case 2; see HY compatible system 2 of the right column in FIG. 19), an analog video signal containing VBI on which additional information (service information SI), video ID, and the like are superposed as needed except for command information is sent to the partner device (step ST90).

On the other hand, if the partner device is a command compatible device (YES in step ST88; case 1; see HY compatible system 1 in the right column in FIG. 19), an analog video signal containing VBI on which additional information (service information SI), video ID, and the like are superposed as needed as well as command information is sent to the partner device (step ST92).

FIG. 19 is a table for explaining the VBI contents in the broadcast systems/package systems in Japan and U.S.A., and the HY compatible system in the present invention.

In FIG. 19, note that package-system video programs in Japan and U.S.A. use Macrovision AGC pulse (pseudo sync pulse for disturbing VCR video recording) areas in VBI lines 10 to 19/273 to 283 as information (command information, additional information, and the like) unique to the HY compatible system.

That is, in command compatible, HY compatible system 1, (a) VBI line 10/273 can contain command information issued by the master (the side that outputs a video signal), (b) VBI line 11/274 can contain command information issued by the slave (the side that receives a video signal), and (c) VBI lines 12/275 to 19/282 can contain additional information (service information).

On the other hand, command incompatible, HY compatible system 2, (a) VBI lines 10/273 to 19/282 can contain additional information (service information).

In FIG. 19, VITS (Vertical Interval Test Signal) is a vertical interval test signal, VITC (Vertical Interval Time Code) is a vertical interval time code, GCR (Ghost Canceller Reference Signal) is a ghost canceller reference signal, and VIR (Vertical Interval Reference Signal) is a vertical interval reference signal (level/hue reference signal).

Also, lines 22/285 to 263/525 are used by an interlaced analog video signal.

FIG. 20 is a view for explaining the signal configuration of various kinds of information (command information, service information, video ID Information, and the like) superposed on line numbers 10 to 20 (or 273 to 283) in FIG. 19. The following explanation will be given taking command information as an example (the same concept applies to command information, service information, video ID information, and the like).

In the signal format of this command information, reference bit REF followed by a 20-bit digital signal is set in VBI lines 10 and 273.

A head REF bit of level "1" (70 IRE) and the next signal bit of level "0" (0 IRE) are fixed, and after 1/0 bits at the head of the information are detected as a unique pattern, the following 20-bit data is read.

In the recording/reproduction characteristics of home-use VHS video or the like, the response begins to drop from around 2 MHz, and is attenuated to −20 dB at 3 MHz. In order to reliably transfer command information and the like even in such relatively narrow band system, the clock frequency must be set at 1 MHz or less. However, if too low a clock frequency is set, the data size (the number of bits) that can be sent in one time is reduced.

As a consequence, as a tradeoff from the perspective of applications, the clock frequency of the digital signal in FIG. 20 is selected to be ⅛ (around 447 kHz) of color subcarrier fsc. However, if a device having broader-band recording/ reproduction characteristics (DVD real-time recording/ reproduction video or the like) is adopted, a higher clock frequency can be set.

In FIG. 20, video level 70 IRE corresponds to logical "1" of the 20-bit digital signal, and video level 0 IRE corresponds to logical "0" of 20-bit digital signal. Even a home-use analog VCR does not cause any failure such as an inversion phenomenon or the like at level "1" which is around 70 IRE.

20-bit command information in FIG. 20 contains 2-bit word 0, 4-bit word 1, 8-bit word 2, and 6-bit CRCC (Circular Redundancy Check Code).

For example, 2 bits of word 0 can be used to define a property or the like, 4 bits of word 1 can define 16 different headers, and 8 bits of word 2 can describe data of the corresponding header.

Property information such as an aspect ratio or the like controls the field angle of a TV screen, and is sent every field to minimize discrimination errors.

CRCC is used to detect an error in the transfer system and to improve discrimination precision. The preset value of CRCC is selected to be "1", so that CRCC does not assume "0" even when data is all "0"s.

Note that two heads are used to record/reproduce a video signal in a home-use analog VCR. When dust or the like becomes attached to one of these heads and the head contact state suffers (the contact state between the tape and the head gap), noise mixes in on a VBI reproduction signal reproduced by that head, and information in FIG. 20 cannot often be normally detected.

To avoid this problem, identical information is successively sent over two fields (line 10 or 11, and line 273 or 274). In this manner, if the contact state of one of the two heads suffers, VBI information in FIG. 20 can be correctly read.

Additional information (service information) or video ID information shown in the right column in FIG. 19 can be superposed on a predetermined line of VBI (line numbers 12/275 to 20/283 in FIG. 19) in the format shown in FIG. 20, except for its total number of bits.

Since pre-authentication cannot be done with an existing device (HY incompatible), no command is superposed on VBI in such case. However, when an HY terminal compatible adapter is connected to an existing device, two-way communications and/or one-way remote control using VBI are/is allowed.

Also, copy generation control information based on CGMS-A (to be described later) can be sent in the format shown in FIG. 20.

A characteristic feature of FIG. 20 lies in that the word configuration (number of bits) that transports the contents of command information (or service information, video ID information, or the like) can change depending on what fraction of color subcarrier fsc is selected for the bit clock.

In other words, a characteristic feature of FIG. 20 lies in that a single line in VBI can hold variable bit length information.

That is, FIG. 20 exemplifies a case wherein the number of bits that form information is 20 when the clock frequency is set at fsc/8. If the clock frequency is raised to fsc/2, the number of bits that form information is 5; if the clock frequency is lowered to fsc/32, the number of bits that form information is 80.

That is, information that requires a smaller number of bits can be processed within a shorter period of time at high clock frequency (fsc/2), while information that requires a larger number of bits can undergo one-line transfer (or transfer using a minimum required number of lines) at low clock frequency (fsc/32) (although the processing speed lowers relatively).

In the above description, the bit clock is obtained with reference to color subcarrier fsc, but can be obtained by other methods. For example, in case of home-use VHS video, the upper limit of a recordable luminance signal (Y signal) component is around 3 MHz (around 5 MHz for S_VHS, around 6 MHz for DVD video). The number of bits of the word configuration in FIG. 20 can be varied within the range from, e.g., 5 bits/line to 80 bits/line by frequency-dividing the luminance signal upper limit frequency (fmax) as needed with reference to reference frequency fmax.

The number of bits of the word configuration of FIG. 20 can also change depending on the contents of information sent from the transmitting device (master device/source device) to the receiving device (slave device/sink device). For example, when VCR (slave device) 10D records a video signal from settop box STB (master device) 19B in FIG. 4, and additional information in FIG. 19 is superposed on VBI of the video signal sent from STB to VCR, the number of bits of the word configuration in FIG. 20 can vary within the range from, e.g., 5 bits/line to 80 bits/line in accordance with the contents of this additional information.

Alternatively, the number of bits of the word configuration in FIG. 20 can be changed depending on the transfer target (the partner device that receives a video signal, i.e., a slave or sink device). For example, assume that a video information from STB (master device) contains text information (closed caption or the like in FIG. 19), and the partner device is a TV having a text information decoder (not shown) or a VCR having no text information decoder. In this case, when the transfer target is changed from the VCR to the TV with the text information decoder, the number of bits of the word configuration in FIG. 20 can be changed from, e.g., 20 bits/line to a value within the range of 5 bits/line to 80 bits/line as needed.

Note that additional information (service information) SI or video ID information can have the same bit configuration (or word configuration) of each line as that of command information.

Also, numerical values exemplified in FIG. 20 are those for the 525 interlaced format, and corresponding values for the 525 progressive format are exemplified in < >.

FIG. 21 exemplifies related processes of analog copy protect of high-resolutionhigh image quality (HD) using the HY terminal and analog copy protect of standard image quality (SD) taking as an example SD video and HD video in Japan and U.S.A.

Note that it is assumed that an HY terminal compatible adapter (that cannot be detached) is attached to an HDTV (HD monitor) which has already been released in Japan. An HD compatible video recording device that has already been released in Japan is excluded from consideration.

In FIG. 21, SD image quality includes up to the 525 progressive format for which Macrovision copy protect may be used.

As for copy protect of digital information, digital watermarking and CGMS (Copy Generation Management System) have been proposed (see Tadashi Ezaki et. al., "CGMS-A Transfer System using VBI", ITE Technical Report, 1997, May 22, Vol. 21, No. 31, pp. 21–26).

In copy control of package media, CGMS-A is attached. In an analog broadcast system, no copy control information is attached. In a digital broadcast system, unique copy control information is used.

FIG. 26 is a table for explaining the contents of the analog copy generation management system (CGMS-A) that can be used in the device interconnect system according to an embodiment of the present invention.

When a copy generation management system (CGMS) code is "0, 0", the corresponding analog video signal is "copy free" (can be unlimitedly copied). This state is the same as that of conventional analog VHS video or analog video disk (laser disk LD) that does not undergo any Macrovision copy protect or the like.

When the CGMS code is "1, 0", analog copying of the corresponding analog video signal is permitted only once. At this time, the CGMS code of the copied medium (VCR video tape or DVD recordable/reproducible video disk) is rewritten from "1, 0," to "1, 1".

On the other hand, if the CGMS code is "1, 1", the corresponding analog video signal is "copy never" (inhibited from being copied). This state is the same as conventional analog VHS video or DVD video disk that has undergone Macrovision copy protect or the like (a copy protect signal is recorded on a tape itself in VHS video, while a player appends a copy protect signal to a reproduced video output in DVD video).

In FIG. 21, care must be taken to observe:

Note 1> An HD monitor which has already been released in Japan and to a HY terminal of which an adapter is attached;

Note 2> An existing device in Japan assumes only an HD monitor, and excludes an HD compatible recorder;

Note 3> SD includes up to the 525 progressive format;

Note 4> Since pre-authentication cannot be made with an existing device, no command is superposed on VBI. However, when the adapter of the present invention is connected to even an existing device, two-way communications/one-way remote control can be made; and Note 5> In copy control methods of individual transfer devices:
CGMS-A is attached in package media;
no copy control information is attached in an analog broadcast system; and
unique copy control information can be used in a digital broadcast system.

Figure 22:
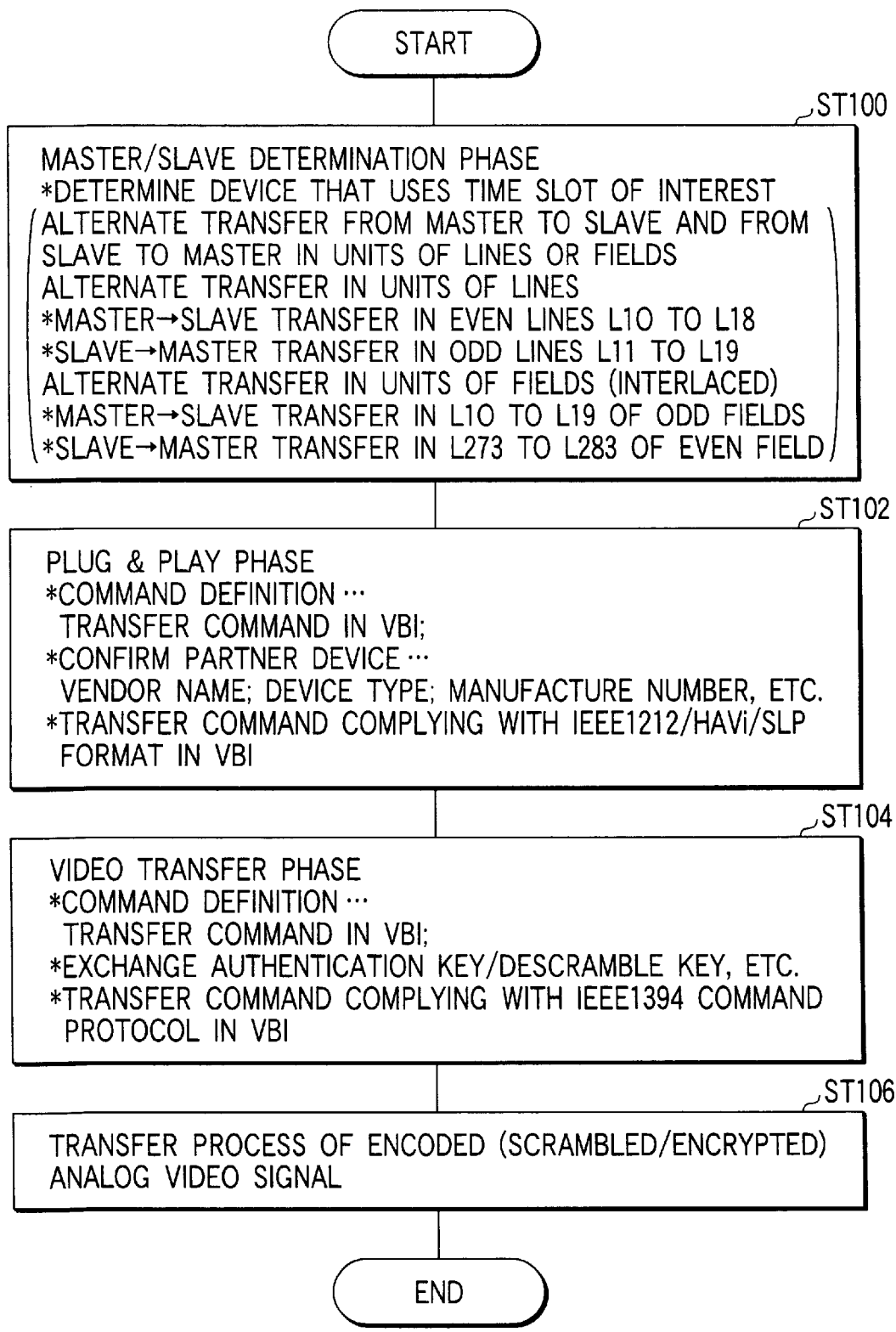
FIG. 22 is a flow chart for explaining the flow of processes from determination of a master/slave to transfer of encrypted information in a device interconnect system according to an embodiment of the present invention.

FIG. 22 is a flow chart for explaining the flow of processes from determination of master/slave to transfer of encrypted information in the device interconnect system according to an embodiment of the present invention.

This processing is executed between, e.g., two arbitrary devices of information processing devices 2000 to 5000 which are interconnected via two-way information transfer path L2000 in FIG. 8.

The following explanation will be given assuming that the processing sequence in FIG. 22 is executed between information processing devices 2000 and 3000 in FIG. 8, for the sake of easy understanding.

Which of the two interconnected devices serves as a master (the side which outputs a video signal) and a slave (the side which receives a video signal) is determined (step ST100). For example, assume that the master position is assigned to information processing device 2000 and the slave position is assigned to the other information processing device (device 3000 in this case) in default setups.

Then, which of device 2000 (master) and device 3000 (slave) uses time slots designated by the slot ID in FIG. 15(e) is determined in the master/slave determination phase.

More specifically, information transfer (VBI information transfer) from the master to the slave is made in the time slots of even lines L10 to L18 of VBI, and information transfer (VBI information transfer) from the slave to the master is made in the time slots of odd lines L11 to L19 of VBI (alternate information transfer in units of lines in association with VBI information).

Alternatively, when an interlaced video signal is used, information transfer (VBI information transfer) from the master to the slave is made in the time slots of lines L10 to L19 of odd fields, and information transfer (VBI information transfer) from the slave to the master is made in the time slots of lines L273 to L283 of even fields (alternate information transfer in units of fields in association with VBI information).

In either case, information of the predetermined word configuration (minimum 5 bits, standard 20 bits, maximum 80 bits in the example in FIG. 20) can be superposed on each line.

Then, the control enters a plug & play phase for automatically setting up the master and slave in a predetermined connection state (step ST102).

In the plug & play phase, commands used between the master (device 2000) and slave (device 30000 at that time (for example, commands exemplified in FIG. 16) are defined. The defined commands can be transferred while being superposed on VBI to have the word configuration shown in FIG. 20.

In the plug & play phase, the partner device (slave device 3000 viewed from master device 2000) is confirmed in addition to command definition (see step ST14 in FIG. 14).

More specifically, the vendor name (device manufacturer name), device type (TV, VCR, or the like), manufacture number, and the like of the partner device are confirmed on the basis of device information (see FIG. 29) as a part of information superposed on VBI.

In addition, in this plug & play phase, commands that comply with the IEEE1212/HAVi (Home AV interoperability)/SLP (Service Location Protocol) format can be transferred using VBI.

The control enters a video transfer phase from the master (device 2000) to the slave (device 3000) (step ST104).

In this video transfer phase, a command to be used in practice (for example, a video recording start command Record) is defined from those defined in the plug & play phase, and is transferred to the partner device while being superposed on VBI.

In this video transfer phase, an authentication key/descramble key, and the like are exchanged as needed (see steps ST16 and ST18 in FIG. 14).

If a CGMS-A code in FIG. 26 is "1, 1" (copy never), an authentication key/descramble key are exchanged if the partner device is a non-recordable device such as a TV or the like. But if the partner device is a recordable device such as a VCR or the like, this key exchange process is skipped.

Furthermore, in this video transfer phase, commands that comply with the IEEE1394 command protocol can be transferred while being superposed on VBI as needed.

Finally, an encoded (scrambled and/or encoded together with various kinds of VBI information) analog video signal is transferred from the master (device 2000) to the slave (device 3000) (step ST106).

After that, a process corresponding to step ST24 in FIG. 14 is executed as needed.

In the above description, information processing device 2000 serves as a master (sender of a video signal) and information processing device 3000 serves as a slave (receiver of a video signal) initially. But since these devices are connected via two-way transfer path L2000 (i.e., the HY terminals of both devices 2000 and 3000 are input/output compatible terminals), the master/slave relationship can be switched.

For example, assume that both devices 2000 and 3000 are VCRs with input/output compatible HY terminals.

In this case, device 2000 (master VCR) can send a reproduced video signal to device 3000 (slave VCR) which can copy that video signal (assuming that the descramble key has already been successfully exchanged in step ST104 in FIG. 22).

Upon completion of this copy, when reproduction of device 2000 is stopped, the recording position of a video tape is changed or a video tape is exchanged, and reproduction of device 3000 is started, device 3000 becomes a master VCR (sender of a video signal), and device 2000 becomes a slave VCR (receiver of a video signal) in turn.

Between the master and slave, a video signal flows one way, but VBI information flows two ways (VBI information can be exchanged between the master and slave in units of lines or fields in step ST100 in FIG. 22). Hence, the master/slave positions can be exchanged based on a status change in VBI command (in this case, video recording of device 2000 is stopped or paused, and reproduction of device 3000 is started).

In the above description, the interconnected HY terminal compatible devices have a one-to-one connection relationship, but this relationship can be expanded to 1-to-N (N is an integer equal to or larger than 1).

For example, in FIG. 8, three slaves (devices 3000 to 5000) are connected to one master (device 2000). The master (device 2000) can detect the device types of slaves by exchanging VBI information before execution of the video transfer phase (step ST104) in the plug & play phase (step ST102) in FIG. 22.

Then, the master (device 2000) sends a video signal (together with a descramble key if it is scrambled) to only a specific slave (e.g., device 3000 such as a TV without any video recording function or the like) that has been authenticated (determined to be video signal transfer OK).

In this case, the master exchanges VBI information with other slaves (devices 4000 and 5000 in this case), but does not send any video signal thereto. However, the master can send a video signal that does not contain any video contents such as a moving image, still image, or the like (e.g., a blue-back signal) to other slaves (devices 4000 and 5000).

Note that time slots can be assigned (step ST100 in FIG. 22) as follows if there are a plurality of slaves:

transfer from master (device 2000)→slave 1 (device 3000) in VBI line L10;

transfer from master (device 2000)→slave 2 (device 4000) in VBI line L12;

transfer from master (device 2000)→slave 3 (device 5000) in VBI line L14;

. . .

transfer from slave 1 (device 3000)→master (device 2000) in VBI line L11;

transfer from slave 2 (device 4000)→master (device 2000) in VBI line L13;

transfer from slave 3 (device 5000)→master (device 2000) in VBI line L15;

. . .

As the master/slave determination method in step ST100 in FIG. 22, the following methods are available (in addition to a method of setting device 2000 in FIG. 8 to be a master as a default):

(a) a method of setting one of devices having a smaller ID number of the device ID (see FIG. 15(e)) to be a master, and the other to be a slave;

(b) a method of setting one of devices, the power switch of which is turned on first, to be a master, and the other to be a slave;

(c) a method of setting one of devices, which outputs some video signal to the HY terminal (not only a normal video signal containing a moving image, but also a blue-back signal or a signal obtained by superimposing some text or graphic data on a blue-back raster) first, and the other to be a slave; and (d) a method of setting one of devices, which makes first challenge (first access) or makes a transmission start declaration first (step ST14 in FIG. 14) to be a master, and the other to be a slave.

When the method of determining a master in default setups is adopted, a core device of the system is suitable for the default master. For example, in a system in which a TV and VCR are connected to a given STB (settop box) via HY terminals, the STB is suitable as a default master.

Alternatively, in a system in which a plurality of HY compatible devices (DVD player, DVD recordable/reproducible video recorder, VCR, and the like) are connected to a TV having a plurality of HY terminals, the TV is suitable as a default master.

Again, in a system various HY compatible devices (DVD player, DVD recordable/reproducible video recorder, HDTV, VCR, and the like) are connected to an AV control center (signal selector, signal distributor, or switcher) having a large number of HY terminals, the AV control center is suitable as a default master.

FIG. 23 is a table for explaining the packet format of information exchanged between interconnected devices in the device interconnect system according to an embodiment of the present invention.

This packet format has a hierarchical structure, and respective layer levels can store various kinds of (expandable) information.

<1> That is, layer level 1 (uppermost layer) stores the version number of this packet format.

For example, version number=1 is set for the packet format used for a system that corresponds to one-to-one information exchange (one each master and slave are connected).

More complicated contents (e.g., a system that corresponds to 1-to-N or N-to-N information exchange) can be coped with by version up (version number=2, 3, . . . ).

In this packet format, the contents of each layer and/or the number of layer levels can be changed in correspondence with the version number.

<2> Layer level 2 of this packet format can store information of the packet length.

When this packet size falls within one VBI line, packet length data can assume a predetermined value (fixed). But when the packet size falls outside one VBI line, packet length information corresponding to an actual packet size is stored in layer level 2.

<3> Layer level 3 of this packet format stores information that indicates if the contents of that packet are a command or a response to a command.

<4> Layer level 4 of this packet format stores the type of contents of that packet.

The type includes information of types upon confirming if the connected partner device is an HY terminal, information of types upon executing plug & play (see step ST102 in FIG. 22) with respect to the connected partner device, information of types upon executing authentication/key exchange (see step ST104 in FIG. 22) with respect to the connected partner device, and information of types upon executing device control (see step ST104 in FIG. 22) with respect to the connected partner device, and the like.

For example, a type of sending an inquiry command "are you HY terminal?" from master (slave) to slave (or master), and a type of sending back a response "YES" to that inquiry from slave (or master) to master (or slave) are available (HY terminal confirmation).

This HY terminal confirmation can also include inquiries "are you input/output compatible HY terminal?", "input-only HY terminal?", "output-only HY terminal?", and so on (note that both the input- and output-only HY terminals can function in the same manner as the input/output compatible HY terminal in association with VBI information).

Alternatively, a type of sending an inquiry command "what type of device are you?" from master (slave) to slave (or master), and a type of sending back a reply response "vendor name (manufacturer name)/device type (TV, VCR, or the like)/manufacture number, and the like" that inquiry from slave (or master) to master (or slave) are available (plug & play).

This inquiry can be in the IEEE1212, HAVi, or SLP format.

Note that inquiries/replies with more detailed contents are exchanged to implement plug & play. For example, the slave (e.g., an AV control center that receives a video signal) issues the following inquiries, and the master (e.g., a DVD player that outputs a video signal) returns replies to these inquiries:

"Send your icon (bitmap data)" . . . "I transfer my device icon (DVD player icon of a specific pattern)"

"What kind of terminal are you?" . . . "I am HY output terminal for processing analog component video Y/Cb/Cr components"

"Send your attribute information" . . . "I (DVD player) am compatible to NTSC interlaced video/NTSC progressive video of aspect ratio 4:3⁄16:9 (see FIG. 30 for other examples of attribute information)

"What is your nationality?" . . . "I am DVD player for use in Japan with region code=2"

<5> Layer level 5 of this packet format stores type dependent fields of the contents of that packet.

For example, if the type of layer level 4 is device control that commands VCR video recording, the type dependent field of layer level 5 can contain the contents "record a satellite broadcast program on BS7 from 1:15:00 pm to 2 pm, Jan. 1, 1999".

A packet that contains a type dependent field with such contents can be transferred from the master (e.g., an STB including a video recording reservation program) to the slave (VCR) in the packet format shown in FIG. 23.

Note that the type dependent field of layer level 5 can be further divided into layers as in IEEE1394AVC (that is, the packet format of FIG. 23 is not limited to five layers in practice).

FIG. 24 is a table for explaining an example (authentication/key exchange) of the contents of layer level 4 (type) in the packet format shown in FIG. 23. This authentication/key exchange can be made in compliance with the IEEE1394 command protocol.

When the type is "authentication/key exchange", layer level 4 of the packet in the format shown in FIG. 23 stores a command for challenging a device certification/authentication request, a response for replying a device certification/authentication request, transmission/reception (see steps ST32 to ST34 in FIG. 17) information of an authentication key, transmission/reception (see steps ST36 to ST38 in FIG. 17) information of an exchange key, request information of a transmission/reception subunit, SRM (System Renewability Message) information, authentication/key exchange cancel information, and the like.

When the master or slave device is considered as a single unit, if each unit has one or more child subunits, e.g., if the slave device has a subunit "TV tuner" and a subunit "VCR", the request information of a transmission/reception subunit in FIG. 24 has contents "what kinds of subunits (tuner, VCR) do you (target/slave device) have?".

The SRM information in FIG. 24 can contain an alert when the system has been hacked and its continues use is not preferable.

FIG. 25 is a table for explaining another example (device control) of the contents of layer level 4 (type) in the packet format shown in FIG. 23.

When the type is "device control", IEEE1394AVC can be used as simplified commands, and the function control protocol (FCP to be described later with reference to FIG. 27) can be used as command/status.

Note that simplified commands are simple ones corresponding to operations used for remote controllers of electric home appliances, and each target device is handled as a single function (TV function alone, VCR function alone, or the like). For example, a target device controlled by a given simplified command is a TV or VCR, and both the TV and VCR are not controlled by that simplified command.

The command names of the simplified commands correspond to opcodes of IEEE1394AVC. For example, opecodes instruct to start reproduction of a VCR, and tuning of a TV tuner.

Operands of the simplified commands correspond to those of IEEE1394AVC. For example, if an opcode instructs to start reproduction of a VCR, triple-speed reproduction, reverse reproduction, or the like can be designated by the contents of the operand.

If an opcode instructs to tune a tuner, channel 1 of ground broadcast (VHF frequency band) or channel 7 of satellite broadcast (BS frequency band) can be designated by the contents of an operand.

FIG. 27 is a view for explaining the flow of commands and responses in the function control protocol (FCP) used in command/status shown in FIG. 25.

In the following description, the master device (e.g., an AV control center equipped with HY input/output terminals) is used as a controller, and the slave device (a VCR with a tuner having HY input/output terminals) is used as a target.

These FCP support devices (controller/target) have registers (not shown) for storing information of commands and responses, and the contents (messages) of commands or responses exchanged between the controller and target can be temporarily stored in these registers.

More specifically, the process shown in FIG. 27 uses a write process in an asynchronous communication, the FCP support devices have command/response registers, and messages are written in the command/response registers.

The controller and target are connected via their HY input/output terminals and, e.g., two-way transfer path L2000 in FIG. 8.

Assume that the controller (master device) issues a processing request "start video recording" to the target (slave device). Then, a controller processing layer of the FCP sends a command corresponding to this request to a target processing layer.

This process is equivalent to write of this video recording command in the type dependent field of layer level 5 in the packet format shown in FIG. 23 (see type code 5 . . . device control FCP/1394AVC; subunit type of type dependent field=0010 . . . VCR; and opcode=C2h . . . video recording in FIG. 32).

Upon receiving the packet containing the video recording command from the controller, the target processing layer of the FCP passes a code corresponding to this video recording command to the slave device (VCR subunit) as the target. At the same time, the target processing layer sends a reply indicating reception of the command to the controller processing layer.

The target (VCR) then starts video recording on a video tape loaded therein. The target (VCR) sends a processing request "display current state (video recording in progress)" to the controller processing layer via the target processing layer (using the packet format in FIG. 23 and the type dependent field in FIG. 32).

Upon receiving the request, the controller processing layer passes the processing request "display of video recording state" to the controller (AV control center with the HY terminal). At the same time, the controller processing layer sends a reply indicating reception of the request to the target processing layer.

The controller (AV control center) turns on or flickers a lamp, text, or icon indicating "VCR video recording in progress" on its own display panel (not shown). Alternatively, the controller (AV control center) sends an on-screen display (OSD) signal indicating "VCR video recording in progress" to a TV monitor (not shown) connected to itself.

The internal functions of interconnected devices can be remote-controlled by IEEE1394AVC commands on the FCP that execute processes shown in FIG. 27.

FIG. 28 is a table for explaining the configuration of simplified command (when type=device control) shown in FIG. 25.

In FIG. 28, devices (with HY terminals) to be controlled by simplified commands assume a TV (or monitor display), analog VCR, digital VCR, DVD player, DVD recorder, STB (settop box), PC (personal computer), switcher (AV control center/signal selector or signal distributor), editor, and the like, but other devices may be controlled.

Device control simplified commands assume simple ones that can be operated by a remote controller, and include control codes common to the devices to be controlled, and individual control codes in units of devices to be controlled.

The common control codes include, for example, a channel designation code, tone volume control code, reproduction command code, recording (video/audio recording) command code, and the like (those issued by keys such as channel select keys, tone volume control keys, reproduction key, video recording key, and the like, which appear on the surface of a versatile remote controller).

The individual control codes include a resolution designation code, aspect ratio designation code, and the like (those issued by keys which are touched less frequently by the user since they are hidden behind the cover on the versatile remote controller).

Note that designation of MPEG1/MPEG2 (a digital video recorder with analog HY input/output terminals), and designation of normal VHS/S-VHS (an analog video recorder analog HY input/output terminals) can be included in the category of the individual control codes.

FIG. 29 is a table for explaining an example of device information used in plug & play or the like of layer level 4 (type) in the packet format shown in FIG. 23.

To implement plug & play, interconnected devices must know each other's partners. For this purpose, various inquiries and replies are exchanged between the connected devices. Upon exchanging inquiries and replies, information shown in, e.g., FIG. 29 is used.

A flag indicating the contents of an inquiry or reply (up to four different types if it is a 2-bit flag) is set. This flag identifies an inquiry or reply, a property declaration that spontaneously declares what it is, or error message.

A device that issues an inquiry (master or slave device) can indicate its device type using a device type ID, and also its manufacturer (vendor) and model using a manufacturer name code.

Also, a device that replies in response to an inquiry (slave or master device) can indicate its device type using a device type ID, and also its manufacturer (vendor) and model using a manufacturer name code.

After the interconnected devices know each other's partners by the device type ID/manufacturer name of the inquiry-side device and the device type ID/manufacturer name of the reply-side device, they can know each other's properties by a property type code and property content code.

FIG. 30 is a table for explaining an example of attribute information used in plug & play or the like of layer level 4 (type) in the packet format shown in FIG. 23.

After the interconnected devices know each other's device types via information exchange in FIG. 29, detailed attributes of data streams that are going to flow therebetween are informed based on the contents in FIG. 30.

For example, when the master device is a new model of a DVD player with an HY terminal, and the slave device is a new model of an HDTV with an HY terminal, if stream ID=0 is designated, the DVD player informs the HDTV of information including a video compression mode (MPEG2 or the like), TV system (interlaced NTSC or the like), aspect ratio (16:9 or the like), video resolution (544×480 dots or the like), and so on as main picture stream properties.

If stream ID=1 is designated, the DVD player informs the HDTV of information including a video coding mode (linear PCM or the like), the number of quantization bits (16 bits or the like), dynamic range control (ON or OFF), sampling frequency (48 kHz or the like), the number of audio channels (2ch or the like), application flag (indicating, e.g., if an audio stream contains 2ch stereo data), video rate (768 kbps or the like), and so on as sound source stream properties.

If stream ID=2 is designated, the DVD player informs the HDTV of information including a caption (Japanese or the like), sub-picture color pallets (red & green, or the like), and so on as sub-picture stream properties.

If stream ID=3 is designated, the DVD player informs the HDTV of information including designation of a character set and the like as additional text stream properties.

FIG. 31 is a view for explaining the configuration of payload information (entity of information) superposed on line number 10/273 (or 11/284) in FIG. 19.

For example, the vertical blanking interval (VBI) of an analog video signal transferred between devices 2000 and 3000 in FIG. 8 contains command information transfer area CITA shown in FIG. 15(b). Information in the signal format shown in FIG. 20 is superposed on, e.g., line number L10 of this command information transfer area CITA.

The head pulse REF bit in FIG. 20 corresponds to "synchronization" part in FIG. 31, bits of words 0 to 2 in FIG. 20 correspond to "payload" in FIG. 31, and CRCC bits in FIG. 20 correspond to "CRCC" in FIG. 31.

A set of a plurality of pieces of information of VBI line number L10 for one or more frames forms a packet in the format shown in FIG. 23.

This packet consists of a packet header, type code (layer level 4 in FIG. 23), type dependent field (layer level 5 in FIG. 23), and padding that fills blanks, as shown in FIG. 31.

The packet header in FIG. 31 is comprised of a packet header ID, packet size (layer level 2 in FIG. 23), version number (layer level 1 in FIG. 23), transfer time information (time code or the like) of the packet, and command/response identification information (layer level 3 in FIG. 23).

The command/response identification information in FIG. 31 can identify one set of command and response.

This command is sent from the sender side that issues an inquiry or command (the controller processing layer on the left side of FIG. 27) to the receiver side that receives the inquiry or command (the target processing layer on the left side of FIG. 27).

On the other hand, this response (response or reply) returns a reply to the inquiry or command execution result from the receiver to the sender.

In other words, in FIG. 31, commands and responses with the aforementioned contents are set in the type code and subsequent portions (portions of type code+type dependent field).

Note that the type code and type dependent code in FIG. 31 have contents exemplified in FIG. 32.

According to the device interconnect system of the present invention, devices which are interconnected via an analog signal line can automatically exchange various kinds of VBI information having different contents or sizes depending on partners connected in correspondence with partners connected without any users having no expert knowledge.

Furthermore, the devices interconnected via the analog signal line can exchange various kinds of VBI information (various commands, various kinds of additional information, and the like) using a packet in the common format (see FIGS. 23 and 31).

Note that the present invention is not limited to the aforementioned embodiments, and various modifications and changes may be made without departing from the scope of the invention when it is practiced. The respective embodiments may be combined as needed as long as possible, and combined effects can be obtained in such case.

Furthermore, the embodiments include inventions of various stages, and various inventions can be extracted by appropriately combining a plurality of constituent requirements requisites disclosed in this application. For example, even when one or a plurality of building requisites are deleted from all the constituent requirements disclosed in the embodiments, an arrangement from which those constituent requirements are deleted can be extracted as the invention if the effect of the present invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for interconnecting a plurality of different devices each having a specific signal terminal through which an analog video signal including a vertical blanking interval can be transmitted, wherein said blanking interval is configured to include key information for mutual authentication, said apparatus comprising:
   a first hardware block configured to exchange said key information between the different devices; and
   a second hardware block configured to transfer information from one of the devices to another one of the devices when the key information exchange is successfully completed.

2. A device configured to be connected to another device, said device having a specific signal terminal through which an analog video signal including a vertical blanking interval can be transmitted, wherein said blanking interval is configured to include key information for mutual authentication, said device comprising:
   a first hardware unit configured to exchange said key information with the another device; and
   a second hardware unit configured to transfer information from the device to the another device when the key information exchange is successfully completed.

3. A method of interconnecting a plurality of different devices each having a specific signal terminal through which an analog video signal including a vertical blanking interval can be transmitted, wherein said blanking interval is configured to include key information for mutual authentication, said method comprising:
   exchanging said key information between the different devices; and
   transferring information from one of the devices to another one of the devices when the key information exchange is successfully completed.

4. The method of claim 3, further comprising:
   determining a master and slave for the different devices being interconnected;
   transferring a prescribed command using the blanking interval, from the one of the devices to the another one of the devices when the master and slave are determined; and transferring the video signal from the one of the devices to the another one of the devices through said specific signal terminal.

5. A device interconnect system comprising a hardware configured to execute the method of claim 3, wherein information having a word configuration defined by a predetermined number of bits is superposed in the vertical blanking interval at a predetermined clock.

6. A device interconnect system according to claim 5, wherein the predetermined clock is obtained by frequency-dividing a color subcarrier frequency of an analog video signal which is transferred from a transmitting device of the plurality of devices to a receiving device of the plurality of devices or an upper limit frequency of a luminance component of the analog video signal, and the predetermined number of bits of the information superposed on the predetermined line of the vertical blanking interval is changed in correspondence with a frequency-division ratio with respect to the color subcarrier frequency or the upper limit frequency of the luminance component.

7. A device interconnect system according to claim 6, wherein the frequency-division ratio changes in correspondence with contents of the predetermined information which is transferred from the transmitting device to the receiving device.

8. A device interconnect system according to claim 6, wherein the predetermined information is packetized in a predetermined format, and the frequency-division ratio changes in correspondence with contents of the packet.

9. A device interconnect system according to claim 6, wherein the vertical blanking interval contains text information, and the frequency-division ratio changes in correspondence with a partner to which the text information is sent.

10. A device interconnect system comprising a hardware configured to execute the method of claim 3, wherein the predetermined information is exchanged in a packet format consisting of a plurality of layer levels between a transmitting device of the plurality of devices, and a receiving device of the plurality of devices, information used to confirm a type of the transmitting device or the receiving device is stored in a predetermined layer of the packet format, and information depending on the type is stored in a layer lower than the predetermined layer of the packet format.

11. A device interconnect system comprising a hardware configured to execute the method of claim 3, wherein an information pack having a predetermined word configuration is superposed on a predetermined line in the vertical blanking interval, and an information packet containing a packet header, a type code, and a type dependent field is formed by a set of one or more information packs.

12. A device interconnect system according to claim 11, wherein the packet header of the information packet contains version number information, packet size information, and command/response identification information used to identify a command and a response to the command.

13. A device interconnect system according to claim 11, wherein the predetermined information is exchanged in a packet format consisting of a plurality of layer levels between a transmitting device of the plurality of devices, and a receiving device of the plurality of devices, and the version number information, the packet size information, the command/response identification, the type code, and the type dependent field belong to different layer levels of the plurality of layer levels.

14. A device interconnect system according to claim 11, wherein the information packet has a common format, and various kinds of information are exchanged using the common format between a transmitting device of the plurality of devices and a receiving device of the plurality of devices.

15. A device interconnect system according to claim 11, wherein the predetermined information is exchanged in a packet format consisting of a plurality of layer levels between a transmitting device of the plurality of devices, and a receiving device of the plurality of devices, the version number information belongs to a layer level different from the packet size information, the command/response identification information, the type code, and the type dependent field of the plurality of layer levels, and contents or the number of layer levels of the plurality of layer levels can be changed in accordance with the version number information.

* * * * *